United States Patent
Baun et al.

(10) Patent No.: US 12,031,519 B2
(45) Date of Patent: Jul. 9, 2024

(54) NACELLE FOR A WIND TURBINE AND A METHOD OF MAKING A WIND TURBINE

(71) Applicant: Vestas Wind Systems A/S, Aarhus N (DK)

(72) Inventors: Torben Ladegaard Baun, Skødstrup (DK); Jens Bredal Nielsen, Struer (DK); Jens-Jørgen Hansen, Højbjerg (DK)

(73) Assignee: Vestas Wind Systems A/S, Aarhus N. (DK)

( * ) Notice: Subject to any disclaimer, the term of this patent is extended or adjusted under 35 U.S.C. 154(b) by 58 days.

(21) Appl. No.: 17/799,018

(22) PCT Filed: Nov. 20, 2020

(86) PCT No.: PCT/DK2020/050320
§ 371 (c)(1),
(2) Date: Aug. 11, 2022

(87) PCT Pub. No.: WO2021/164831
PCT Pub. Date: Aug. 26, 2021

(65) Prior Publication Data
US 2023/0068808 A1 Mar. 2, 2023

(30) Foreign Application Priority Data
Feb. 17, 2020 (DK) .......................... PA 2020 70091

(51) Int. Cl.
*F03D 13/10* (2016.01)
*B66C 23/20* (2006.01)
*F03D 80/50* (2016.01)

(52) U.S. Cl.
CPC ............ *F03D 13/10* (2016.05); *B66C 23/207* (2013.01); *F03D 80/50* (2016.05)

(58) Field of Classification Search
CPC ....... F03D 13/01; F03D 80/50; B66C 23/207; F05B 2230/61; F05B 2240/916
See application file for complete search history.

(56) References Cited

U.S. PATENT DOCUMENTS

| 7,614,850 B2 | 11/2009 | Rogall |
| 7,735,808 B2 * | 6/2010 | Viladomiu i Guarro ..................... F03D 80/50 416/142 |

(Continued)

FOREIGN PATENT DOCUMENTS

| AU | 2006338693 A1 * | 8/2008 | ........... B66C 23/207 |
| DE | 102007062622 A1 | 6/2009 | |

(Continued)

OTHER PUBLICATIONS

Danish Patent and Trademark Office, Search and Examination Report in PA 2020 70091, Aug. 13, 2020.

(Continued)

*Primary Examiner* — Pedro J Cuevas
(74) *Attorney, Agent, or Firm* — Wood Herron & Evans LLP

(57) ABSTRACT

A wind turbine nacelle configured for mounting on a wind turbine tower and housing a rotor-supporting assembly defining a rotation axis. The nacelle comprises a main unit arranged to be connected to a wind turbine tower and housing the rotor-supporting assembly. A crane is placed outside the main unit and connected directly to the main frame.

24 Claims, 20 Drawing Sheets

(56) References Cited

U.S. PATENT DOCUMENTS

| | | | |
|---|---|---|---|
| 7,837,443 B2 | 11/2010 | Mikkelsen | |
| 8,011,893 B2 | 9/2011 | Stiesdal | |
| 8,104,631 B2* | 1/2012 | Stegemann | B66C 23/06 212/179 |
| 8,142,155 B2 | 3/2012 | Numajiri et al. | |
| 8,827,648 B2* | 9/2014 | Pedersen | B66C 23/207 416/204 R |
| 9,228,567 B2* | 1/2016 | Bitsch | F03D 13/40 |
| 9,660,492 B2* | 5/2017 | Lemma | F03D 9/25 |
| 9,745,953 B2* | 8/2017 | Neumann | F03D 80/50 |
| 10,094,357 B2* | 10/2018 | Therkildsen | F03D 80/88 |
| 10,625,993 B2* | 4/2020 | Lopez Pielago | B66C 23/207 |
| 10,988,351 B2* | 4/2021 | Aitken | B66C 23/68 |
| 11,168,671 B2* | 11/2021 | Aitken | F03D 13/10 |
| 11,261,063 B2* | 3/2022 | Aitken | F03D 13/10 |
| 11,274,657 B2* | 3/2022 | Mortensen | F03D 13/10 |
| 11,661,923 B2* | 5/2023 | Aitken | F03D 13/10 29/889.1 |
| 2007/0200103 A1* | 8/2007 | Viladomiu i Guarro | B66C 23/207 254/334 |
| 2010/0011575 A1* | 1/2010 | Numajiri | B66C 17/04 29/889.1 |
| 2012/0228881 A1 | 9/2012 | Siegfriedsen | |
| 2013/0011272 A1* | 1/2013 | Mortensen | F03D 13/10 416/244 R |
| 2014/0017047 A1* | 1/2014 | Bitsch | F03D 80/50 414/800 |
| 2015/0044011 A1* | 2/2015 | Matulewicz | B66D 1/60 414/800 |
| 2015/0167342 A1 | 6/2015 | Montaner Fraguet | |
| 2015/0284218 A1* | 10/2015 | Fenger | B66C 23/207 212/242 |
| 2015/0288232 A1* | 10/2015 | Lemma | H02K 7/1838 29/598 |
| 2015/0300037 A1* | 10/2015 | Pellerin | E04H 12/085 212/199 |
| 2017/0022966 A1* | 1/2017 | Therkildsen | F03D 80/88 |
| 2017/0314535 A1* | 11/2017 | Mortensen | F03D 13/10 |
| 2018/0282134 A1* | 10/2018 | Lagerweij | B66C 23/54 |
| 2020/0071138 A1* | 3/2020 | Aitken | F03D 13/40 |
| 2020/0378368 A1* | 12/2020 | Aitken | F03D 80/50 |
| 2021/0024333 A1* | 1/2021 | Pedersen | B66C 25/00 |
| 2021/0206606 A1* | 7/2021 | Aitken | F03D 80/88 |
| 2022/0025871 A1* | 1/2022 | Aitken | F03D 80/50 |
| 2022/0154696 A1* | 5/2022 | Mortensen | F03D 80/60 |
| 2022/0250877 A1* | 8/2022 | Fenger | B66C 23/185 |
| 2022/0281722 A1* | 9/2022 | Fenger | B66C 23/34 |
| 2023/0160366 A1* | 5/2023 | Baun | F03D 13/20 52/173.1 |
| 2023/0303366 A1* | 9/2023 | Fenger | B66C 23/207 |
| 2023/0340941 A1* | 10/2023 | Baun | F03D 13/10 |

FOREIGN PATENT DOCUMENTS

| | | | | |
|---|---|---|---|---|
| EP | 1101934 | A2 | 5/2001 | |
| EP | 1677000 | A2 | 7/2006 | |
| EP | 2063119 | A2 | 5/2009 | |
| EP | 2063119 | A2 * | 5/2009 | F03D 13/10 |
| EP | 2147885 | A1 | 1/2010 | |
| EP | 2161445 | A1 | 3/2010 | |
| EP | 3026263 | A1 * | 6/2016 | B66D 1/741 |
| EP | 3276169 | A1 | 1/2018 | |
| EP | 3312415 | A1 | 4/2018 | |
| EP | 3312415 | A1 * | 4/2018 | B66C 23/185 |
| EP | 3372550 | A1 | 9/2018 | |
| ES | 2665004 | A1 * | 4/2018 | B66C 23/185 |
| ES | 2665004 | B1 * | 1/2019 | B66C 23/185 |
| WO | 0234664 | A1 | 5/2002 | |
| WO | 2004042227 | A1 | 5/2004 | |
| WO | WO-2007096008 | A1 * | 8/2007 | B66C 23/207 |
| WO | 2008078342 | A1 | 7/2008 | |
| WO | 2009033925 | | 3/2009 | |
| WO | 2010026114 | A2 | 3/2010 | |
| WO | 2011117005 | A2 | 9/2011 | |
| WO | WO-2012079579 | A1 * | 6/2012 | B65G 37/00 |
| WO | 2016055065 | A1 | 4/2016 | |
| WO | 2019166066 | A1 | 9/2019 | |

OTHER PUBLICATIONS

European Patent Office, International Search Report and Written Opinion in PCT Application No. PCT/DK2020/050320, Feb. 16, 2021.

"Eco 100 talking the torque and getting into good shape for O&M maintainability" published at "Modern Power Systems" on Sep. 1, 2008 (Year: 2008).

"Alstom Eco100 Guided Tour", screenshot of YouTube video https://www/youtube.com/watch?v=btr411_ZcAQ, Feb. 9, 2015 (Year: 2015).

"Voltage dips testing campaign in ECO100", Alstom presentation Apr. 20, 2009 (Year: 2009).

"Thermal optimization of nacelles", thermal analysis performed from 2006-2008 (Year: 2008).

International Searching Authority, International Search Report and Written Opinion issued in corresponding PCT/EP2011/051238 dated Dec. 9, 2011, 11 pages.

Danish Patent and Trademark Office, Search and Exam Report issued in corresponding DK Application No. PA 2010 70117 dated Nov. 5, 2010, 5 pages.

* cited by examiner

NACELLE FOR A WIND TURBINE AND A METHOD OF MAKING A WIND TURBINE

INTRODUCTION

The present disclosure relates to a wind turbine nacelle configured for mounting on a wind turbine tower and housing a rotor-supporting assembly. The rotor-supporting assembly defines a rotation axis and it is carried by a main frame. The nacelle comprises a main unit which comprises the main frame and houses the rotor-supporting assembly. The main unit is arranged to be mounted on the wind turbine tower via the main frame.

The disclosure further relates to a wind turbine with such a nacelle and to a method of making a wind turbine.

BACKGROUND

Wind turbines increase in size in terms of nominal power output as well as in terms of physical dimensions of the individual parts of the wind turbine. Therefore, the size of the nacelle must also be increased to accommodate the required wind turbine components. The increasing size demands new solutions for transportation and lifting of components during the assembly procedure.

SUMMARY

It is an object of embodiments of the disclosure to facilitate further modularity, ease of design and manufacturing, and allow for improved maintenance of wind turbines. It is a further object of embodiments of the disclosure to provide a nacelle which is transportable using ordinary transport means and to lower transportation and handling costs without limiting the possible size of the nacelle.

According to these and other objects, the disclosure provides a wind turbine nacelle as mentioned in the introduction and comprising at least one crane placed outside the main unit and connected to the main frame, e.g. directly to the main frame. This allows a flexible way of attaching and detaching a crane while transferring the load directly into the tower via the main frame.

The main unit may define at least two side wall portions extending along the rotation axis, e.g. in parallel with the rotation axis, and on opposite sides of the rotation axis, i.e. on opposite sides of a plane through the rotation axis. In one embodiment, the main unit is box shaped with two sets of such two surface portions, two of which are forming sidewalls and two of which are forming a bottom and a roof.

The crane may particularly be attached along an outer surface of one of these side wall portions. This allows good reachability and facilitates mounting of the hub and blades by use of the crane.

The nacelle may further comprise at least one service unit placed along one of the side wall portions. The main unit and the service unit are separate units releasably assembled at a service unit interface, and the service unit accommodates a crane. This allows the crane to be delivered to the wind turbine in the service unit, and to be protected by the service unit.

The service and/or the main units may be formed with a size and/or the outer shape comparable to, or equal to, the size and shape of a shipping freight container. Each unit thereby inherits the advantages of shipping freight containers with respect to handling, transportation, and storage. Shipping freight containers can for example be handled anywhere in the world by ship, train, and truck etc. and at lower costs compared to bulk transport.

The cost savings are even more pronounced by shipping freight containers constituting the units. A shipping freight container is also referred to as an intermodal container, a standard freight container, a box container, a sea fright container, or an ISO container, and refers in general to a container used to store and move materials and products in the global containerized intermodal freight transport system for intercontinental traffic. The shipping freight container may follow the dimensional and structural specifications in the ISO standard of ISO 668:2013 for series 1 freight containers.

The disclosure may relate to an upwind wind turbine or to a downwind wind turbine.

The nacelle may be carried either directly by the tower, or indirectly via intermediate tower structures. If the wind turbine is of the traditional horizontal axis type, the nacelle is typically carried by a yawing arrangement directly between the tower top and the nacelle. The disclosure may, however, also relate to a multiple rotor wind turbine of the kind where more than one nacelle are carried by a transverse beam structure which is again carried by the tower.

The main unit is the part of the nacelle connected to the tower, either directly or indirectly via said intermediate tower structure or structures. The main unit may particularly be considered to be the central part of the nacelle and houses parts of the drivetrain such as at least a part of the rotor shaft and the generator, and the main unit thereby supports the rotor.

The wind turbine could be a direct drive wind turbine with the generator typically placed outside the nacelle, or the wind turbine could be with the generator located in the main unit.

The rotor may be connected to a rotor shaft, or the wind turbine may comprise what is generally known as "a kingpin" on which the rotor is rotating, i.e. the main shaft may be stationary. The main unit may, depending on the type of wind turbine, comprise further parts, e.g. a gear box, a bearing system and different kinds of peripheral equipment, e.g. for lubrication, cooling, and control purpose. The main unit may particularly comprise a main frame connecting the drivetrain and the tower or intermediate tower structure, e.g. via a yawing arrangement. The main frame may particularly be a casted component.

The main frame may support the rotor assembly e.g. including the main shaft through its bearing support, and it may optionally also support directly or indirectly the powertrain elements e.g. including a gearbox and/or a generator, driven by the main shaft.

Thus, the mainframe may be rotatable relative to the tower via the yawing arrangement. Alternatively in a multiple rotor-type wind turbine the rotatable connection can be achieved by connecting at least two main frames of individual nacelle structures to a tower via said intermediate tower structure which is again joined to the tower via a yawing arrangement.

The main unit and the service unit are assembled in the service unit interface, e.g. an interface extending in the direction of the rotation axis. The service unit interface may be configured for release of the service unit from the main unit after the main unit is assembled on the tower top. For that purpose, the service unit interface may comprise mutually interlocking structural features on the main unit and on the service unit. Examples of such mutually interlocking features may be protrusions on one of the main and service unit and indentations or holes on the other one of the main and service unit, the service unit interface may be a bolted interface allowing releasable joining of the main and service units, or the service unit may be held in place on the main unit by cables by which the service unit can be lowered to the ground for service, replacement of components or for transport of components and personnel between ground and the nacelle. In one embodiment, the service unit interface is configured such that the service unit can be received by the main unit when the service unit is lowered in close vicinity to the main unit. Such a service unit interface may be constituted by hooks or an upwardly and outwardly projecting track on at least one of the main and service units.

The nacelle may comprise a first interface configured for connection of the crane to the service unit, and a second interface configured for connection of the crane to the main frame. In that way the crane can be fixed to one or both of the service unit and the main unit.

Typically, the crane could be fixed to the service unit during transport and to the main unit during use for lifting heavy components.

The crane may be movable between a collapsed configuration in which it is completely enclosed by the service unit and an expanded configuration in which it extends through an opening of the service unit. For that purpose, the service unit may include an opening, e.g. in the roof and comprise a hatch for closing the opening. The service unit may also be completely open upwards, i.e. without a roof, and a tarp may be provided for protection until use of the crane.

The crane may be configured to operate on parts of rotor carried by the rotor-supporting assembly. For that purpose, the crane may be configured to cooperate with another crane, e.g. a crane placed along the other of the at least two side wall portions and connected directly to the main frame.

The crane may comprise a power interface configured to releasably connect to a power supply in the main unit, e.g. an electric or hydraulic power supply.

The service unit may comprise accommodation facilities for personnel. Such facilities may include inter alia a workshop, a spare part storage, a toilet, a kitchen, or a bathroom, etc.

The service unit may further form a fixture for intermediate storage of large wind turbine components during repair. A fixture may e.g. be configured for intermediate fixation of a gearbox, a transformer, a generator, or other large or heavy components. The fixture may form a predesigned fixation structure which is designed and dimensioned for carrying the large weigh of the component in question and it may be located to facilitate a pre-determined disassembly and reassembly of the component from and to its operational location in the wind turbine.

The nacelle may further comprise an additional crane connected to the main frame, e.g. placed along the other of the at least two side wall portion of the main unit and for connection directly to the main frame.

A control unit may be provided for operating the crane and the additional crane in a coordinated procedure where reeling of a crane line of the crane and reeling of an additional crane line of the additional crane are conducted simultaneously.

The crane line may be reeled by a power driven winch and the additional crane line may be reeled by an additional power driven winch. Both the power driven winch and the additional power driven winch may be hydraulic winches powered by the same hydraulic supply to establish identical pressure for both winches and thereby share the load equally between the two cranes.

In a second aspect, the disclosure provides a wind turbine with a nacelle as described herein.

In a third aspect, the disclosure provides a method of making a wind turbine, the method comprising:
 receiving a main unit having a main frame configured to form part of a rotor-supporting assembly and arranged to be connected to a wind turbine tower via the main frame;
 receiving at least one crane;
 attaching the main unit to the tower via the main frame;
 arranged the crane outside the main unit and connecting it to the main frame;
 using the crane for hoisting wind turbine components.

At least one crane may be accommodated in at least one service unit arranged to be connected releasably to the main unit, and wherein the crane is arranged along the first outer side wall portion by attaching the service unit to the main unit, and attaching the crane directly to the main frame.

The crane may be used for lifting at least a part of the rotor.

In one embodiment, the service unit or the crane is attached to the main unit before the main unit is attached to the wind turbine tower. In an alternative embodiment the service unit or the crane attached to the main unit after the main unit is attached to the wind turbine tower.

The service unit and/or the crane may be detached from the main unit when the crane has been used for lifting the components. In that way the crane and service unit can be reused in other wind turbine assembly procedures.

An auxiliary unit may be attached to the main unit to replace the service unit or crane after the crane has been used and detached. The auxiliary unit may house an operative component of the wind turbine, i.e. a component being used during operation the wind turbine for conversion of the wind energy. Such a component may be a transformer, a converter, or similar components. The auxiliary unit may e.g. replace the service unit by reusing the same interface to the main unit, e.g. the same fixtures, bolt holes or other structures used for assembling the main unit and the service unit.

LIST OF DRAWINGS

In the following, embodiments of the disclosure will be described in further details with reference to the drawing in which:

FIGS. 1a and 1b illustrate wind turbines;
FIG. 2 illustrates the nacelle of the wind turbine;
FIG. 3 illustrates a nacelle with a crane in a service unit;
FIGS. 4 and 5 illustrate a nacelle with two cranes in two separate service units;
FIG. 6 illustrates an embodiment where the service unit comprises two units 61, 62 located one above the other;
FIG. 7 illustrates schematically details of the service unit interface;
FIG. 8 illustrates the main unit and service unit from FIG. 7 after the service unit has been attached to the main unit;
FIG. 9 illustrates an embodiment, where the second interface is constituted by bolt shaped fixation pins;
FIGS. 10, 11 illustrate in further details another embodiment of a first and a first interface;
FIGS. 12-15 illustrate 4 different embodiments of interfaces between the main unit and the service unit.
FIGS. 16-18 illustrate an embodiment where the main unit and service units are assembled by a hinge structure;
FIGS. 19, 20 illustrate further details of a hook for attaching the service unit to the main unit;

DESCRIPTION OF EMBODIMENTS

The detailed description and specific examples, while indicating embodiments, are given by way of illustration only, since various changes and modifications within the spirit and scope of this disclosure will become apparent to those skilled in the art from this detailed description.

Figure 1A:
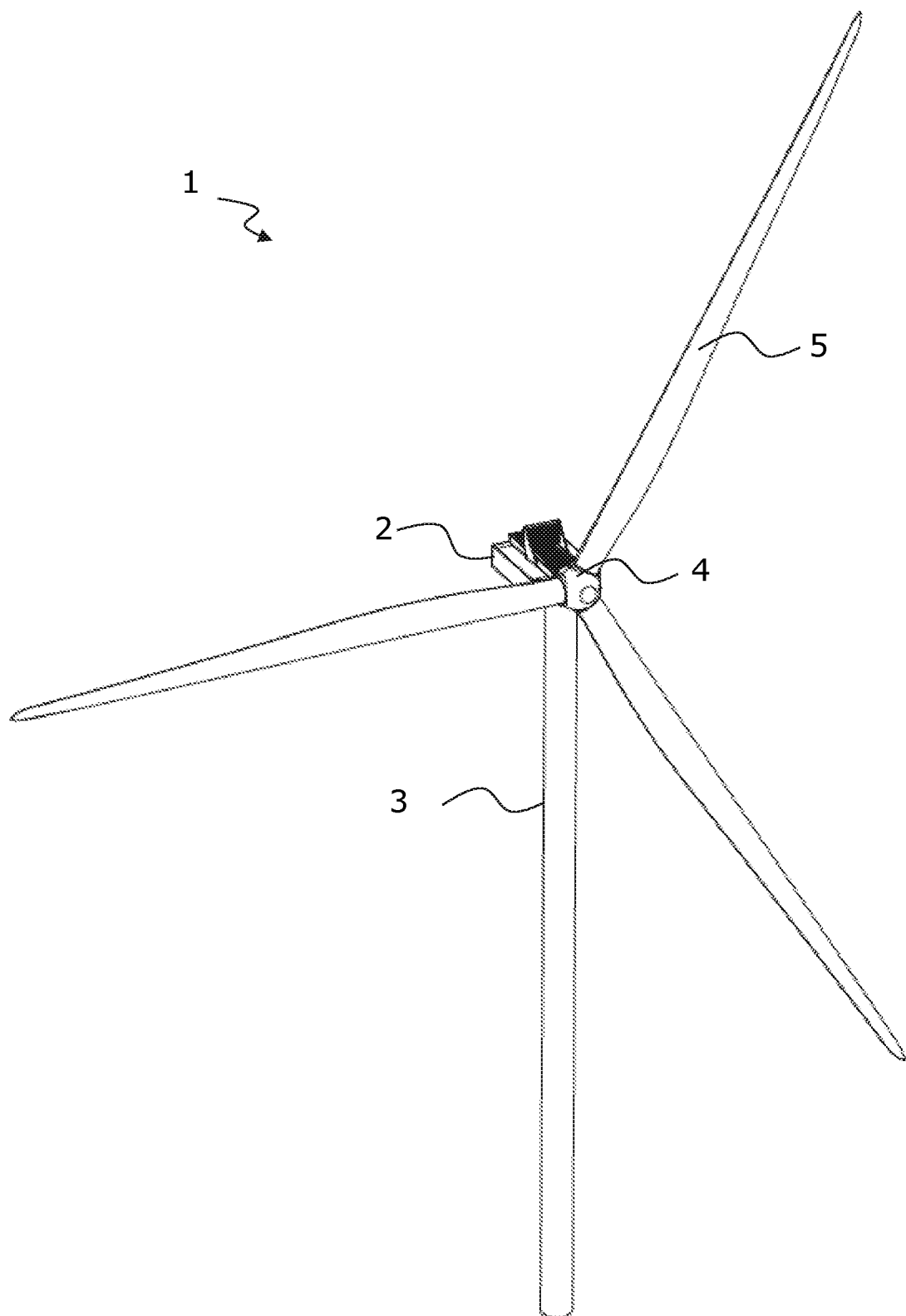
Figure 1B:
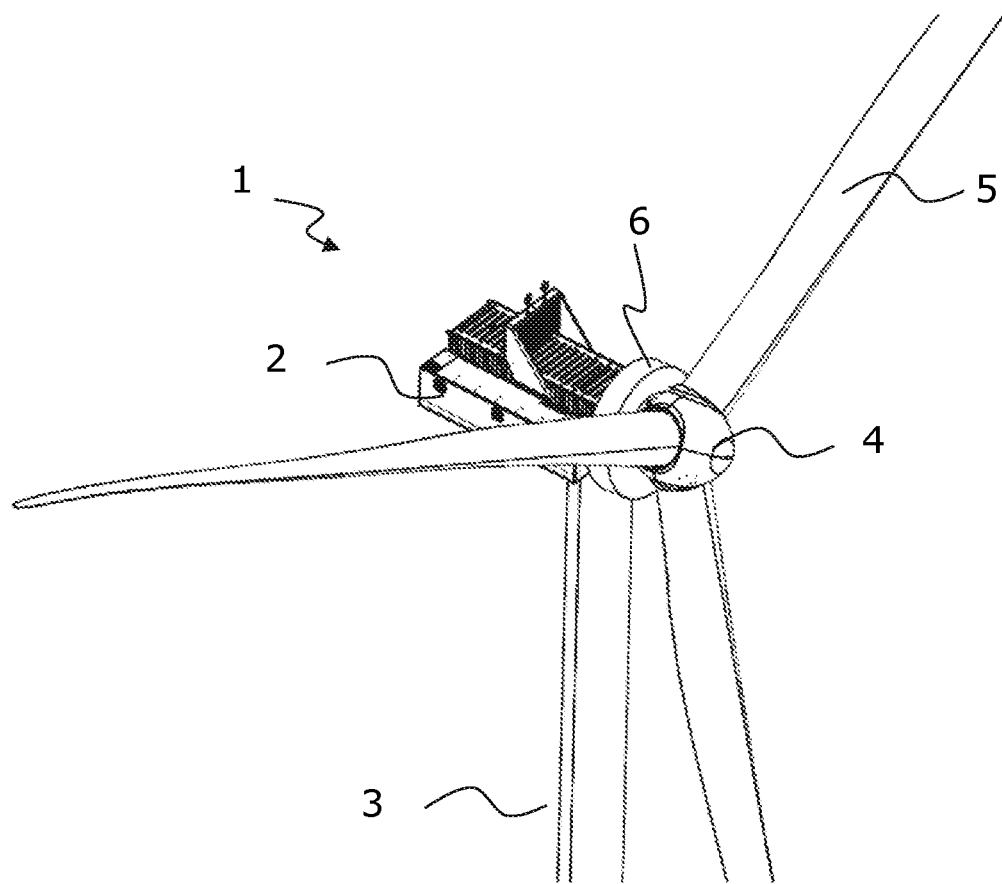

FIGS. 1a and 1b illustrate wind turbines 1 with a nacelle 2 mounted on a tower 3. A hub 4 carrying three rotor blades 5 forms a rotor and is carried by a rotor-supporting assembly in the nacelle 2. Typically, the rotor-supporting assembly comprises a rotor shaft connecting a gear arrangement and a generator to the hub. A gear is, however, not always required since the generator could be directly driven by the shaft. FIG. 1b illustrates a direct drive wind turbine with the generator 6 located outside the nacelle.

Figure 2:
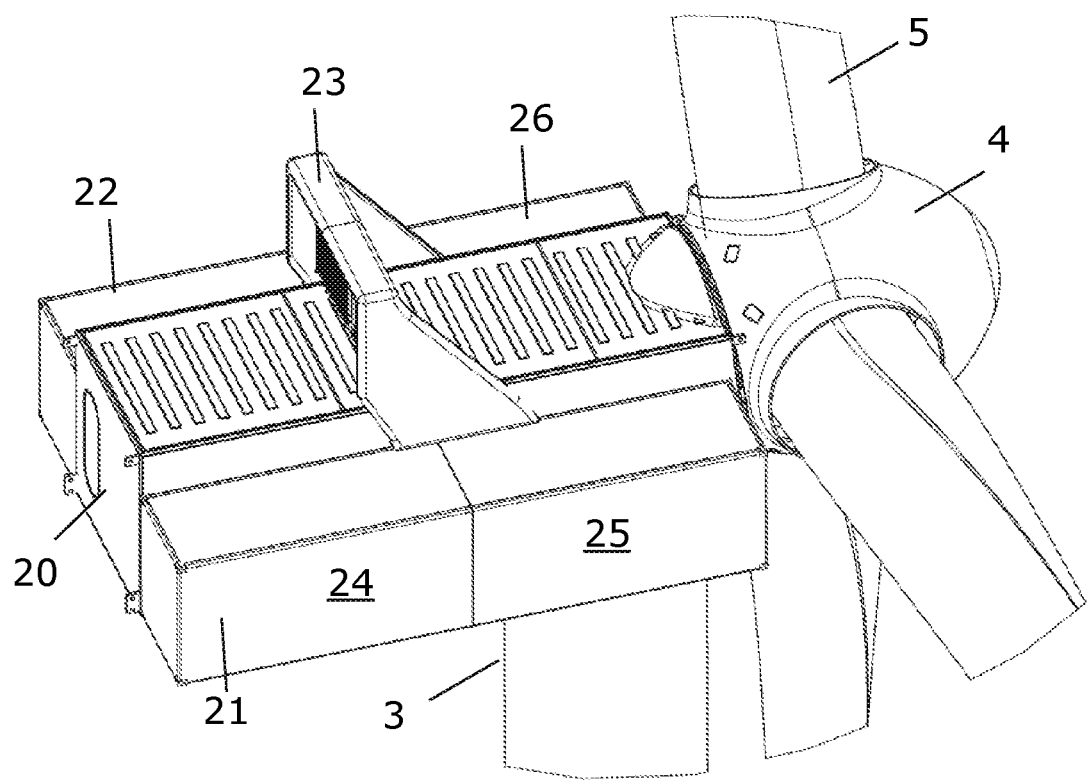

FIG. 2 illustrates an embodiment where that the nacelle comprises a main unit 20 and two service units 21, 22. A cooling area 23 is arranged on top of the nacelle. The cooling area is formed by a heat exchanger which may form part of the main unit, and/or any of the service units. The main unit 20 is mounted on the tower 3 via a yawing arrangement (not shown), allowing the nacelle 2 to rotate in order to direct rotor blades 5 carried by the hub 4 into the wind. The service unit 21 comprises two separate compartments 24, 25. One of the two compartments 24 contains a crane, and the other one of the two compartments 25 facilitates accommodation of crew members working on the assembly of the wind turbine. The service unit 22 accommodates a crane.

Figure 3:
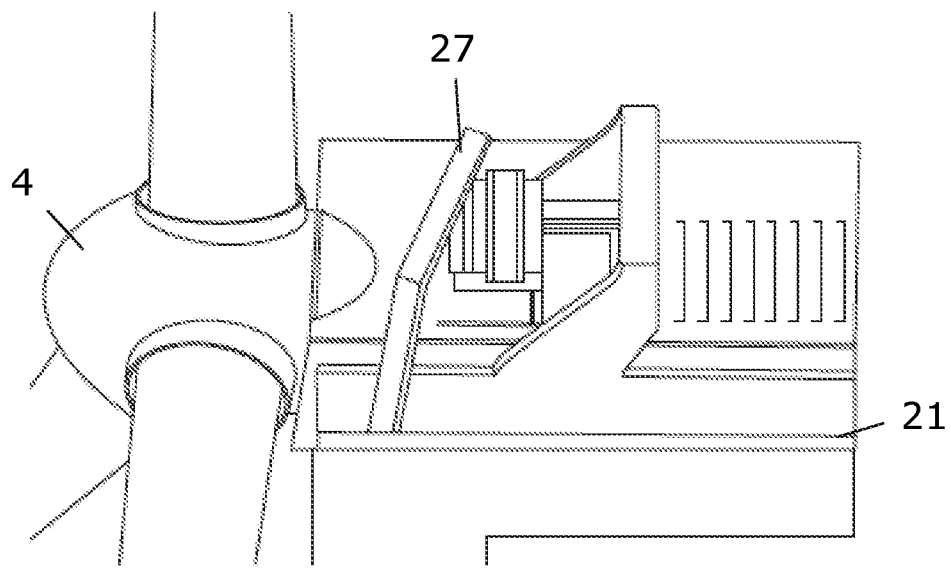

FIG. 3 illustrates the wind turbine seen from the opposite side and with the hatch 26 in an open position. The crane 27 is unfolded and ready to operate.

Figure 4:
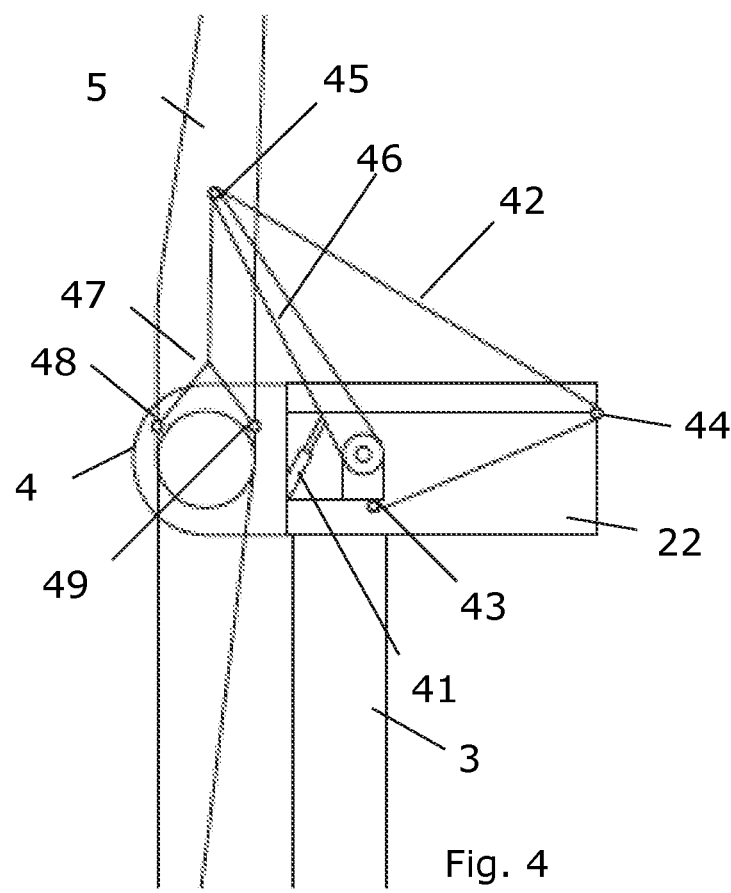

FIG. 4 illustrates a side view of the nacelle in which the outer side panel is removed to thereby better illustrate the internal components in the service unit 22. The crane is in the unfolded state. The crane is movable between the unfolded and the folded state by use of the hydraulic piston 41. The crane line 42 runs from a winch 43 around a pulley 44 placed at the rear end of the service unit 22. From the pulley, the crane line 42 extends to the top pulley 45 at the end of the crane arm 46 and ends in a spreader which separates the hoisting point 47 into two hoisting points 48, 49 attached to the hub or to the blades for lifting and assembling the hub to the rotor supporting assembly in the main unit. The crane can comprise any known form of crane including any kind of support column or crane arm, and with or without articulation ability for the arm. The crane may include a jib, e.g. attached to the crane in a manner known from tower cranes, and the crane arm may be expandable, e.g. in a telescopic way.

Figure 5:
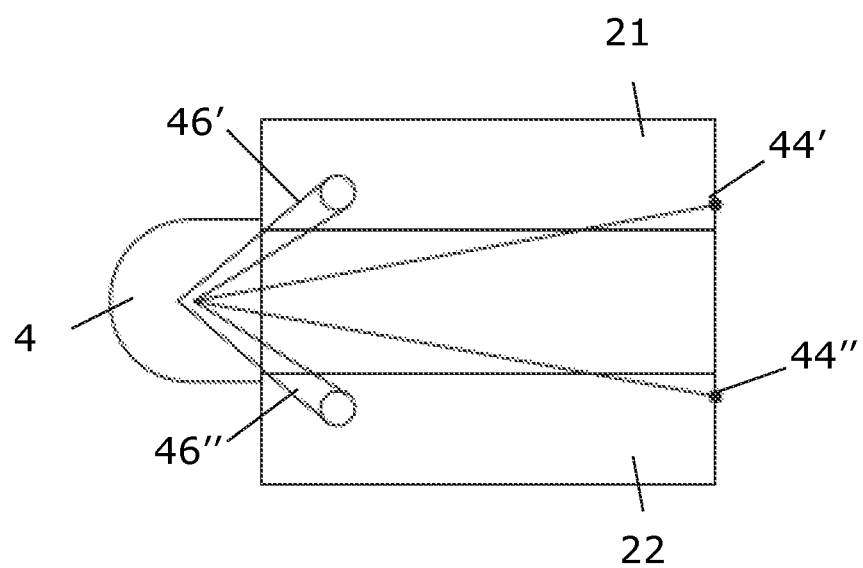

FIG. 5 illustrates an embodiment where the cranes in both service units 21, 22 are used in combination for lifting the hub. The crane line of each crane extends about the pulleys 44', 44" to the top pulleys of each crane arm 46', 46".

Figure 6:
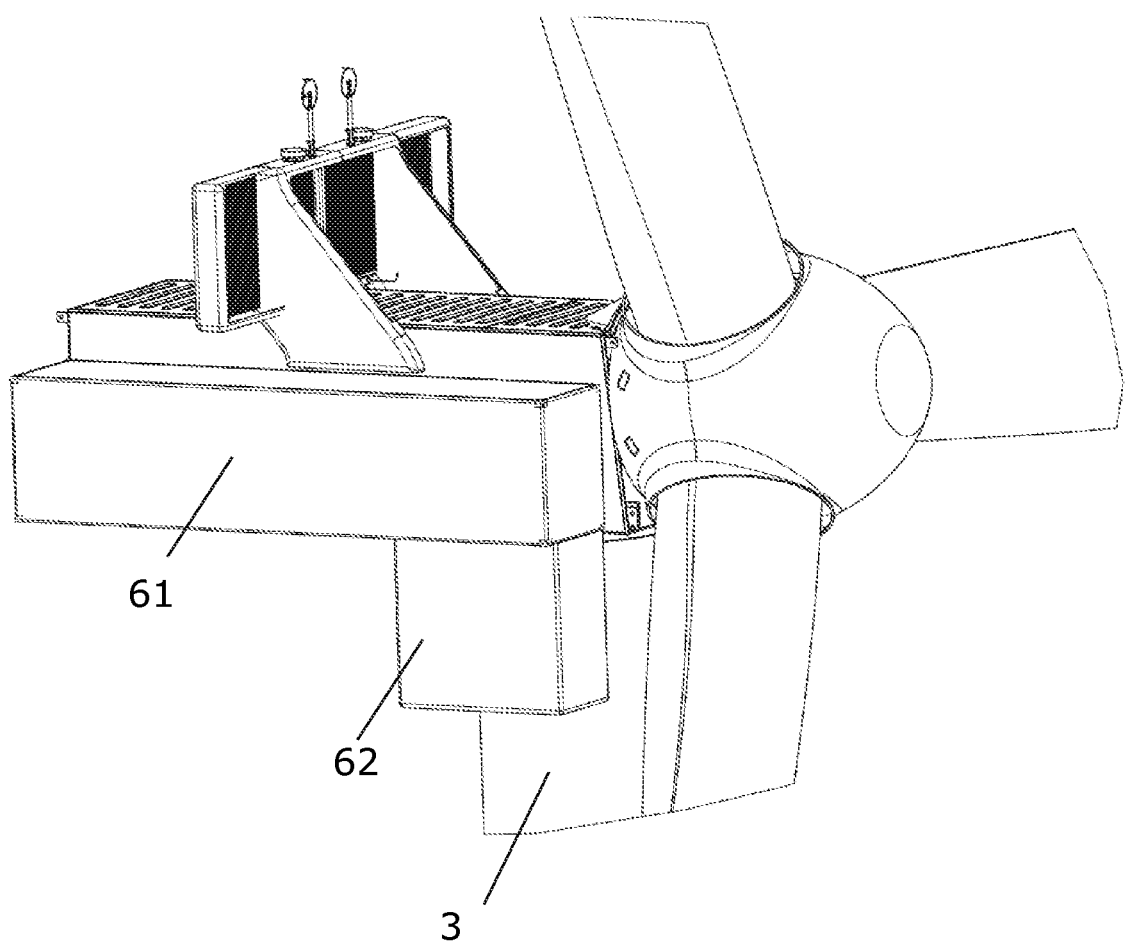

FIG. 6 illustrates an embodiment where the service unit comprises two sub-units 61, 62 which are located one above the other. The sub-unit 61 is constituted by a 40 foot container and accommodates the crane. The sub unit 62 is constituted by a 20 foot container and accommodates crew and spare parts used during assembly of the wind turbine.

FIGS. 7-20 illustrate details of different embodiments of interfaces between the main unit and the service unit. The service unit interface joins the units in a releasable manner and allows the service unit to be replaced e.g. after the assembly or maintenance procedure is finished.

Figure 7:
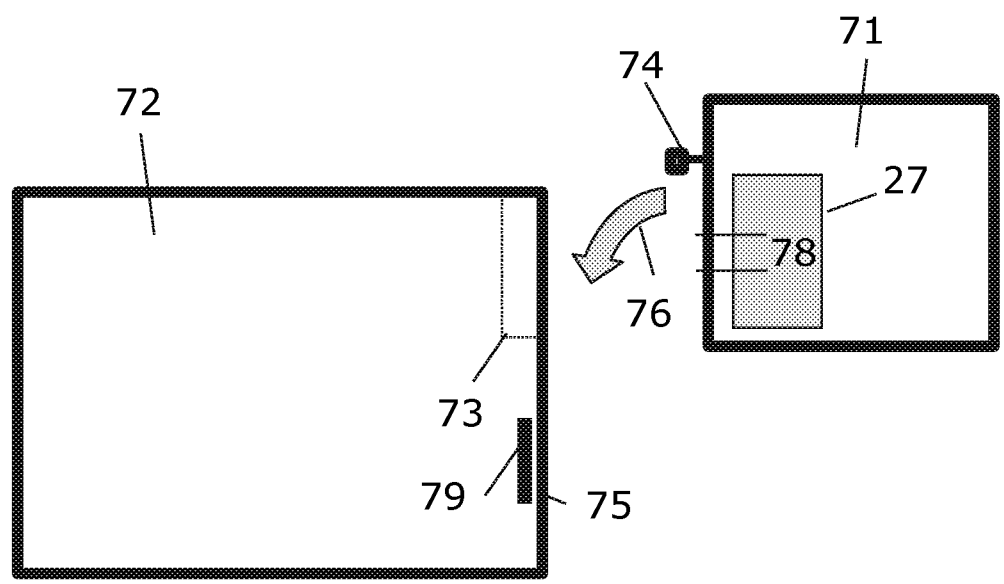

FIG. 7 illustrates schematically details of the service unit interface. The service unit interface contains a unit fixation structure which joins the service unit 71 and the main unit 72 in a releasable manner and allows the service unit to be attached to the main unit after transport to the installation site, or to be attached later, e.g. during maintenance. In the disclosed embodiment, the unit fixation structure is constituted by an inward groove or track 73 in the main unit. The track 73 is illustrated with a dotted line and defines a recess into the outer surface 75. The track has a C-shaped profile in a horizontal cross section, i.e. when seen from above, the track is configured to receive the projection 74 provided on the service unit, and particularly it can receive the projection 74 through a procedure where the service unit 71 is lowered down along the outer surface 75 of the main unit 72. This is illustrated by the arrow 76. This procedure allows easy attachment or detachment of a service unit and the crane accommodated therein.

The main unit may form a load path from the crane, which is housed in the service unit, down into the tower, e.g. via the main frame. Particularly, this load path may be different from the load path from the service unit into the tower. In the following, this is explained relative to different embodiments.

The service unit 71 accommodates a crane 27 which is fixed to the service unit by a structure referred to therein as "a first interface". The first interface is constituted by a fixation structure e.g. in the form of bolts or similar fixation arrangements 78.

The main unit has a crane-supporting assembly 79 forming part of the main frame (not illustrated) and configured for receiving the weight of the crane 27 when the service unit is received and fixed on the main unit.

Figure 8:
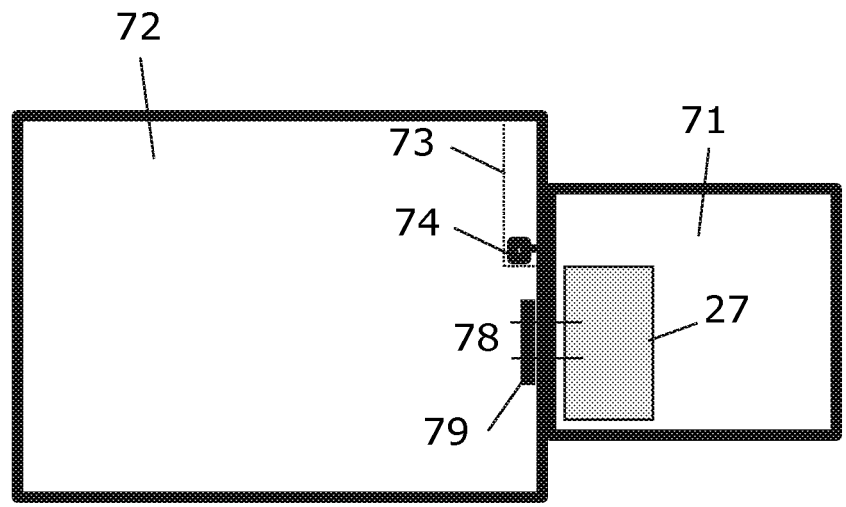
Figure 36:
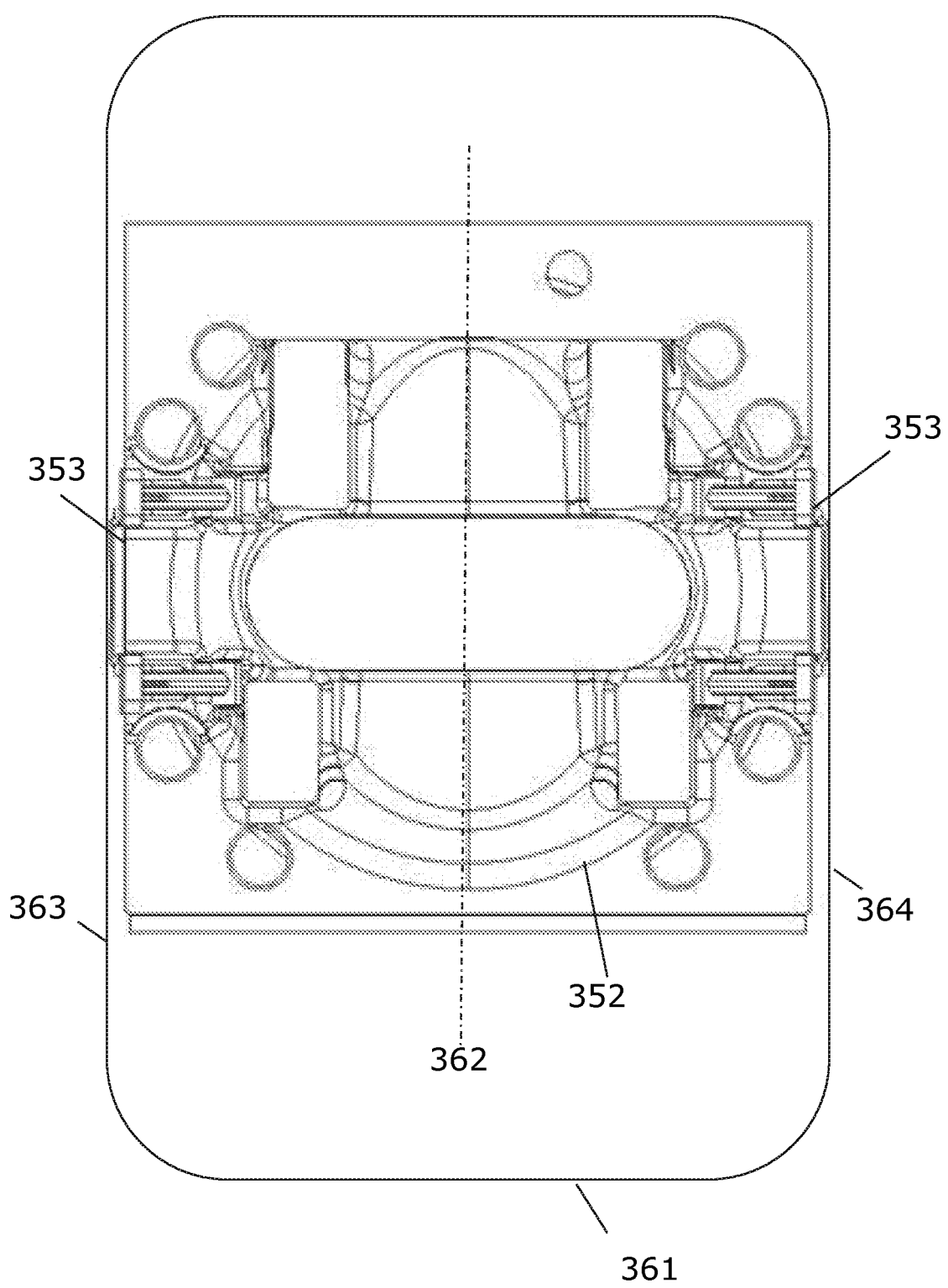
Figure 37:
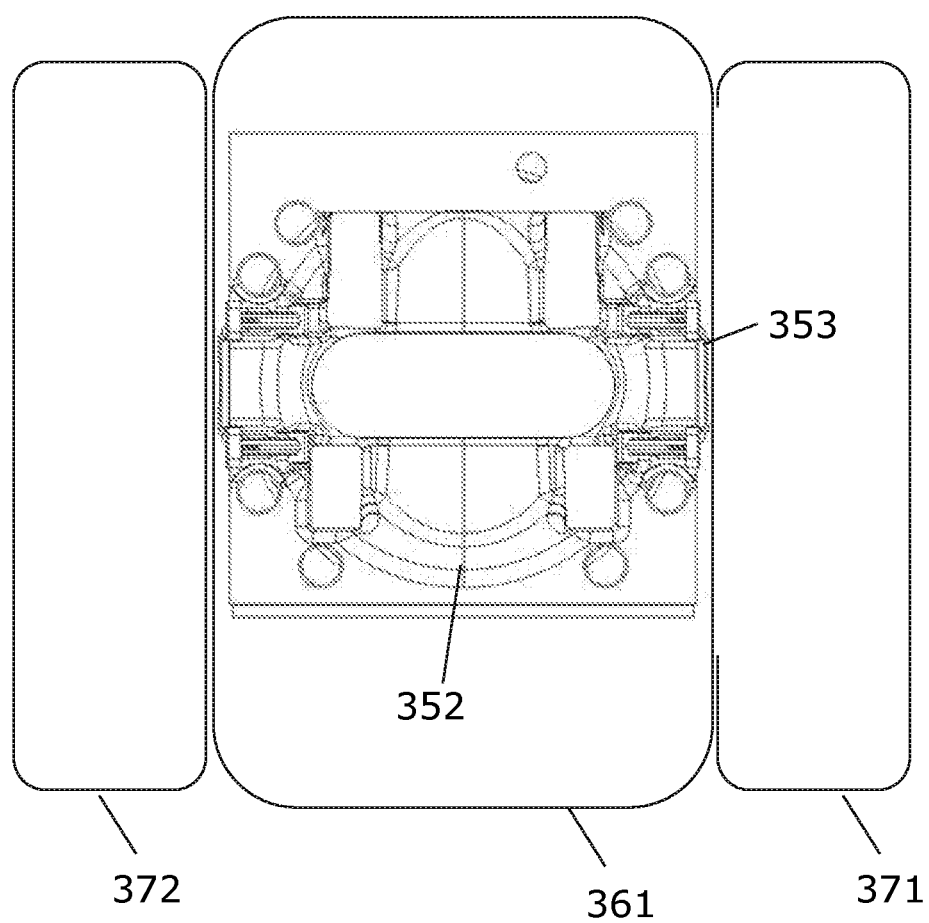

FIG. 8 illustrates the main unit and service unit from FIG. 7 after the service unit has been attached to the main unit. In this state, the bolt shaped fixation pins 78 are extended sideways to the left and thereby engage into the crane-supporting assembly 79. The crane-supporting assembly is connected to the main frame to thereby direct loads from the crane directly into the tower via the main frame. Further details of the crane-supporting assembly are illustrated in FIGS. 35-37.

The bolt shaped fixation pins now constitute what herein is referred to as "a second interface" by which the crane is carried directly by the main unit. The second interface forms part of a load path from the crane into the tower, and the service unit interface between the main unit and the service unit forms part of another load path from the service unit into the tower.

In the illustrated embodiment of FIGS. 7-8, the first and second interfaces are both constituted by the same set of bolts which extend from the crane into one or both of either the service unit or main unit.

Figure 9:
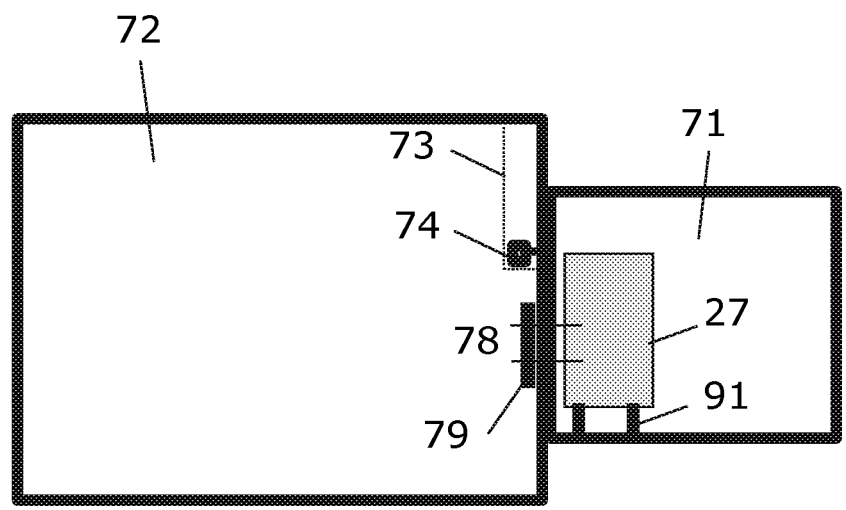

FIG. 9 illustrates an embodiment, where the second interface is constituted by bolt shaped fixation pins and the first interface is constituted by support legs 91 between a bottom of the crane and the bottom of the service unit.

Figure 10:
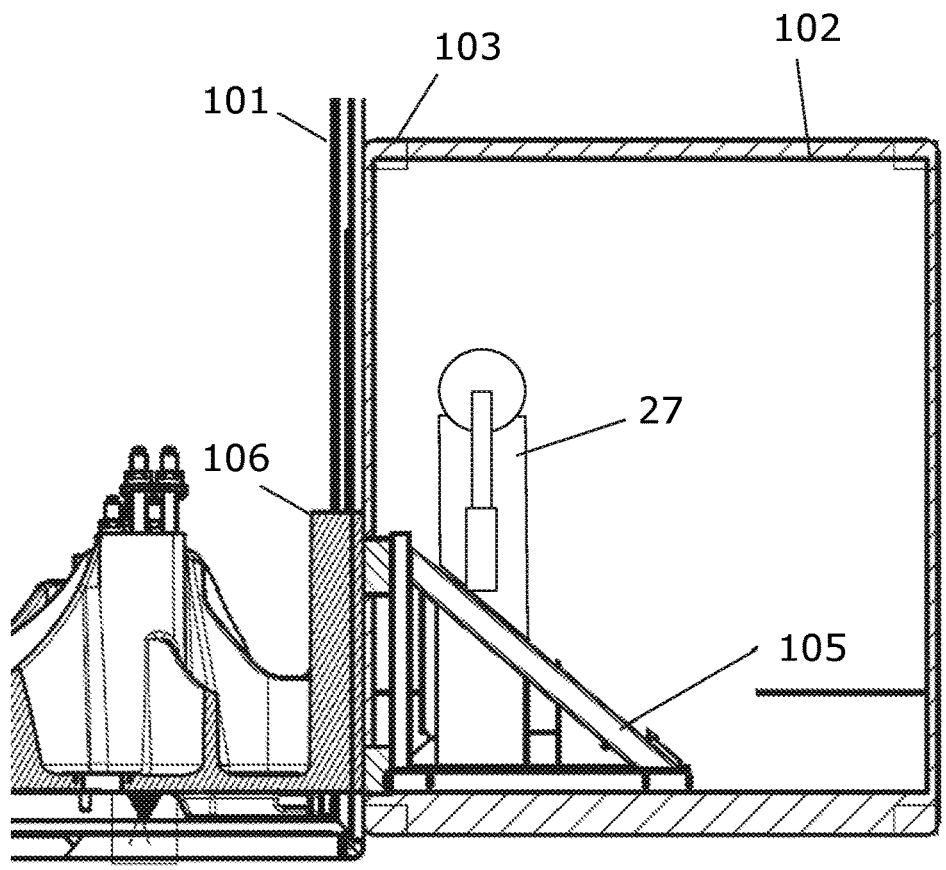

FIG. 10 illustrates in further details another embodiment of the first and second interfaces. In this embodiment, the main unit 101 and the service unit 102 are joined by the unit interface formed by a fixation structure constituted by the corner lifting points 103 of the container which constitutes the service unit 102.

The crane 27 is carried by the support frame 105 resting on the bottom of the service unit 102 and it is suspended directly on the main frame 106 inside the main unit 101. The main frame thereby forms part of the load path for the crane into the tower.

At least 50 percent of the weight of the crane 27 is thereby carried by the main unit 101 and the remaining weight is carried by the service unit 102, which is again carried by the main unit 101. That remaining part of the weight is thereby not carried directly by the main unit 101.

Figure 11:
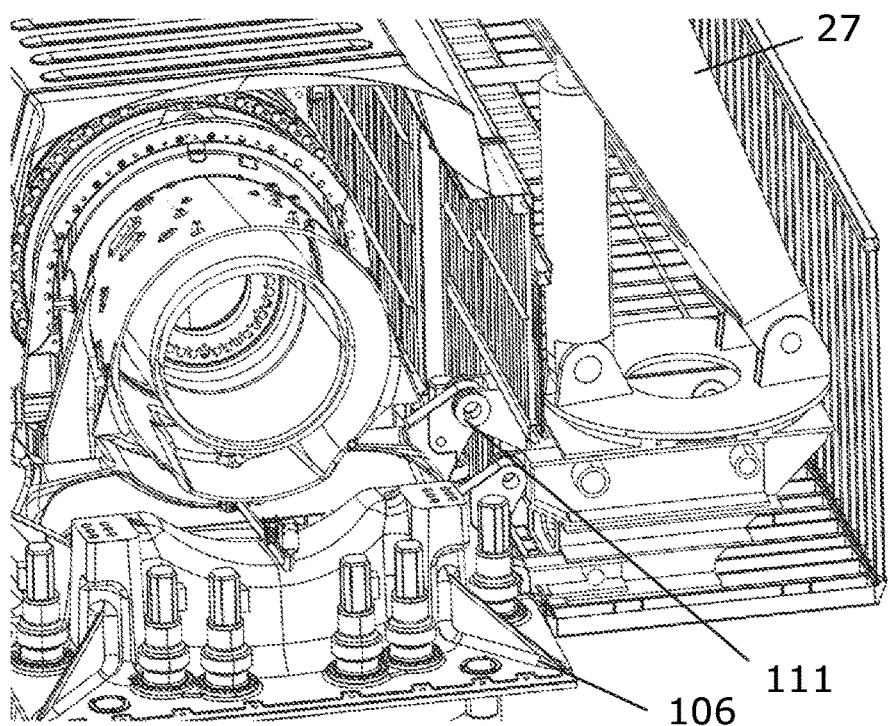

FIG. 11 illustrates an embodiment comparable to the embodiment in FIG. 10 but where the crane 27 is fixed directly to the main frame by use of brackets 111 extending through a sidewall in the main unit and thereby forms a load path for the crane into the tower via the main frame.

FIGS. 12-15 illustrate four different embodiments of the unit interface with different fixation structures between the main unit and the service unit. In each of these four illustrations, the main unit 121 and the service unit 122 are connected by cooperating structures forming the unit fixation structure and being described in further details below.

Figure 12:
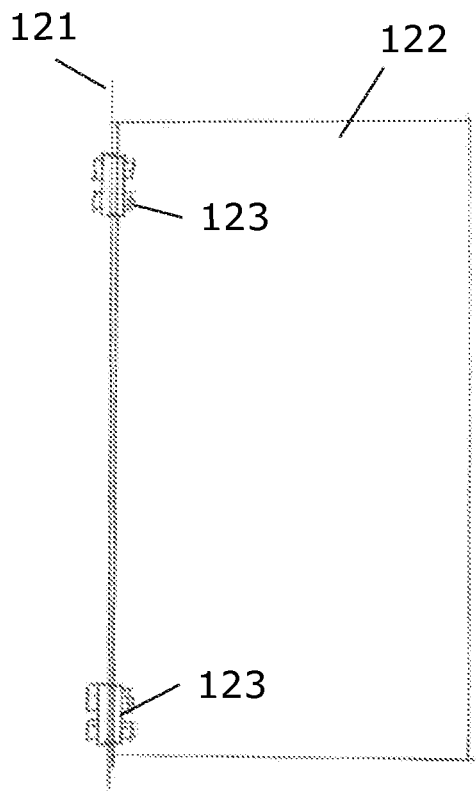

In FIG. 12, the cooperating structures are constituted by brackets 123 by which the main and service units are joined by bolts.

Figure 13:
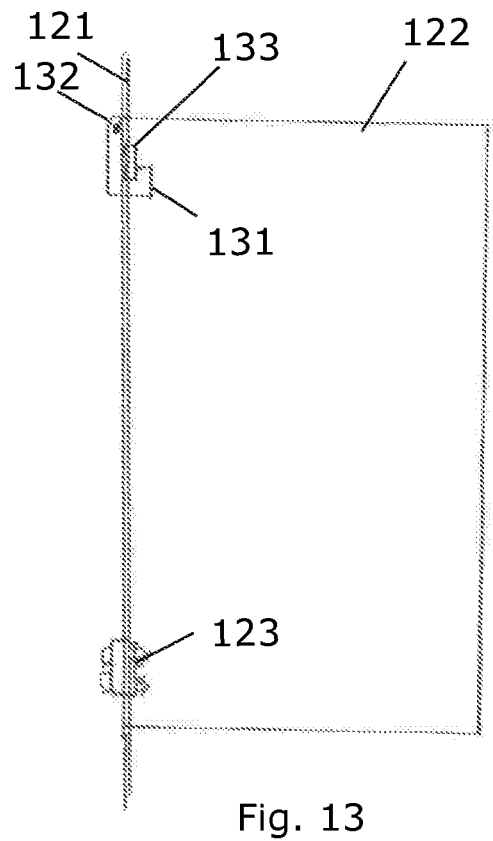

In FIG. 13, the cooperating structures are constituted by a lower bracket 123 similar to the one used in FIG. 12. At the upper edge, the main unit and service unit are assembled by a hook 131 pivotally joined to the main unit at the hinge point 132. The hook can rotate as indicated by the arrow 133 and engages the edge-bracket 134 of the service unit when in the illustrated position. When the lower bracket 123 is removed, and the hook 131 is rotated into the main unit, the service unit can be lowered to the ground.

Figure 14:
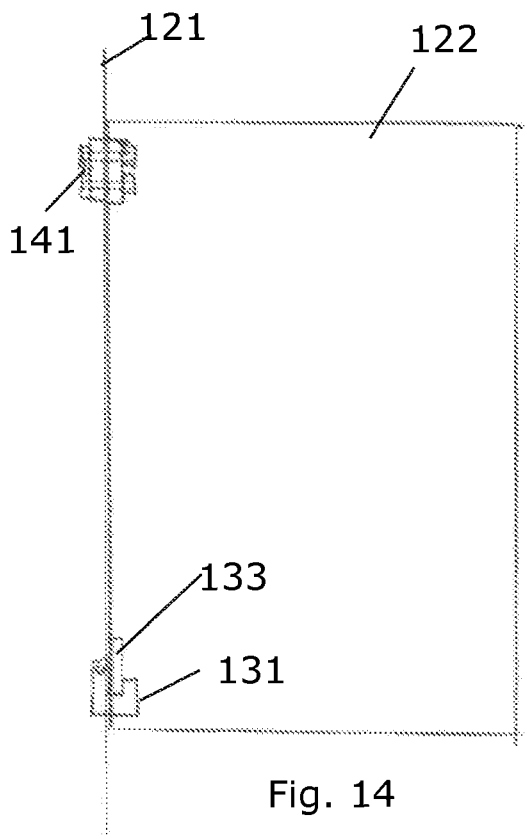

The embodiment in FIG. 14 is comparable to the embodiment in FIG. 13, but where the lower bracket is replaced with an upper bracket 141, and the hook is placed at a lower edge.

Figure 15:
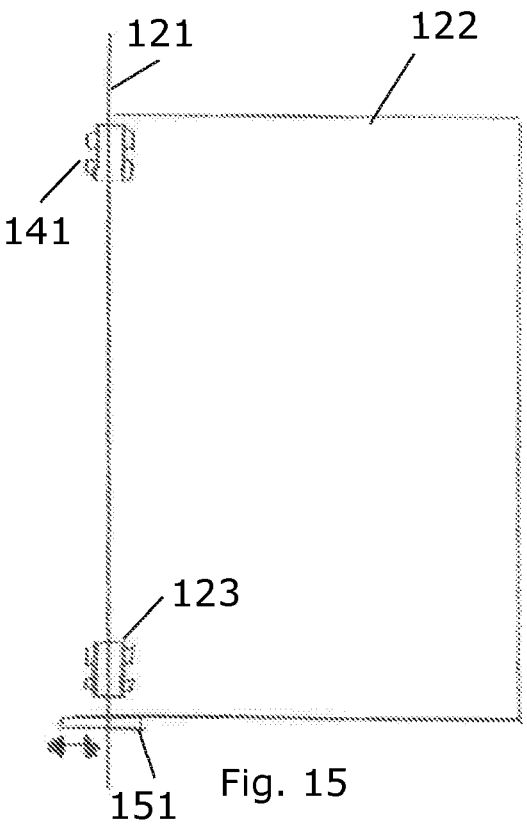

In FIG. 15, a lower and an upper bracket is used for bolting the service unit to the main unit, and a slidable support 151 supports the lower surface of the service unit while the bolts are attached. If it is desired to lower the service unit to the ground, e.g. for replacement or maintenance of the crane, or if crane is not used anymore, the slidable support can be slid to the left and the service unit can be lowered down, e.g. by use of an additional crane build into the main unit or attached directly to the tower etc.

In any of the embodiments shown in FIGS. 12-15, the brackets or hooks direct the load from the service unit into a rigid part of the main unit, e.g. into load carrying column e.g. a corner column of the main unit. Various structural features may connect the brackets or hooks which carry the service unit directly to the main frame in the main unit to thereby establish a load path into the tower.

In addition to the hook and bracket unit fixation structure illustrated in FIGS. 12-15, a second interface (not shown) connects a crane (not shown) directly to the main frame inside the main unit.

Figure 16:
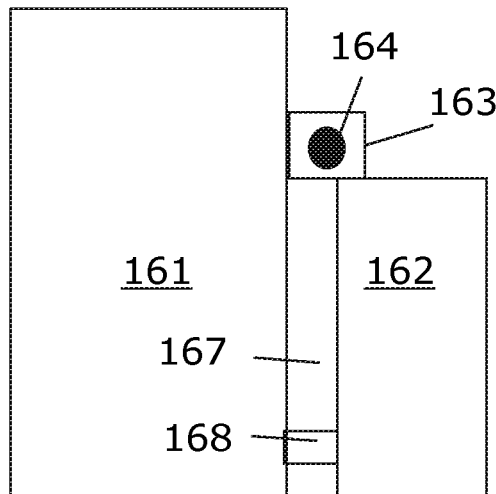
Figure 17:
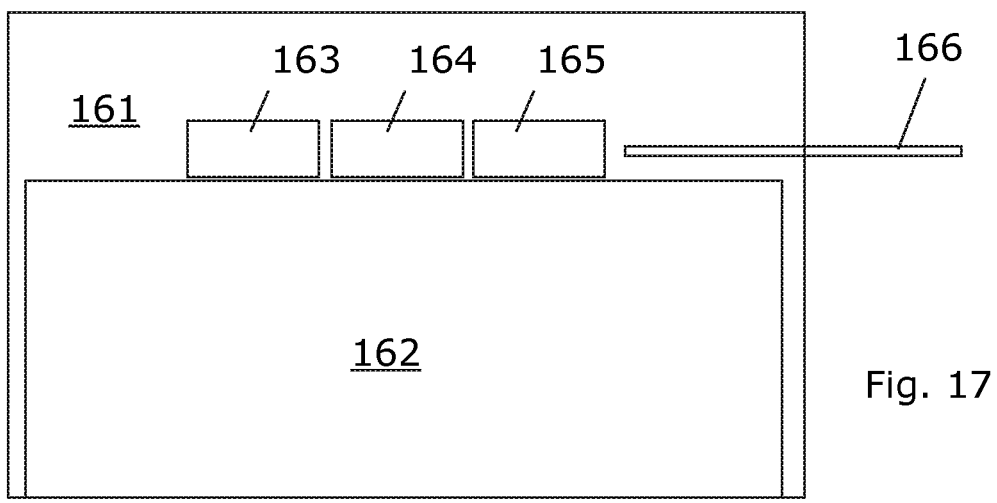
Figure 18:
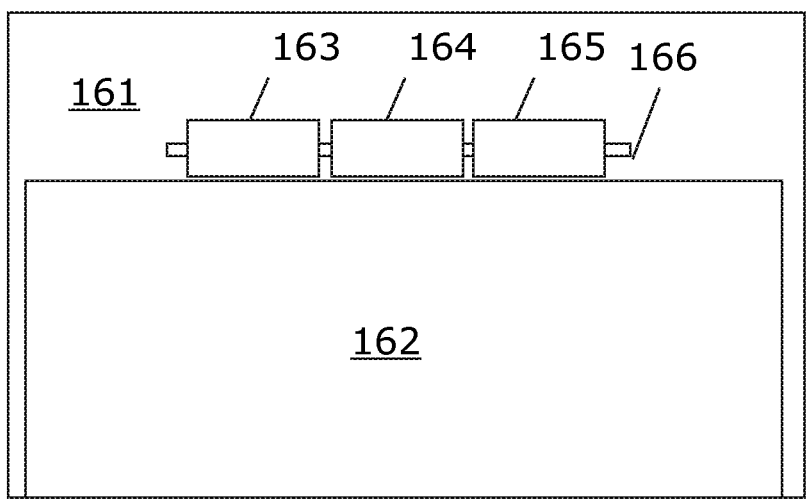

FIGS. 16-18 illustrate an embodiment where the main unit and service units are assembled by a hinge structure comprising hinge elements 163, 164, 165 with a hole for receiving a hinge pin 166 extending through the hinge elements. FIG. 16 further shows that the service unit interface forms a gap 167 allowing air to pass e.g. from beneath the nacelle to above the nacelle, through the gap. The gap is held open at the bottom by the distance element 168, which could be constituted by a number of pins or an open structure allowing air to pass between the units.

Such a gap may increase thermal convection and thus cooling of the space inside the main and service units. The gap is not limited to the embodiment with the hinge structure but could be combined with any other assembly method.

FIGS. 17 and 18 illustrate the hinge elements 163, 164, 165 and the hinge pin 166. In FIG. 17, the hinge elements are positioned correctly relative to the each other such that the hinge pin can be slid into the hinge elements. In FIG. 18, the hinge pin is inserted through the holes of the hinge elements.

Figure 19:
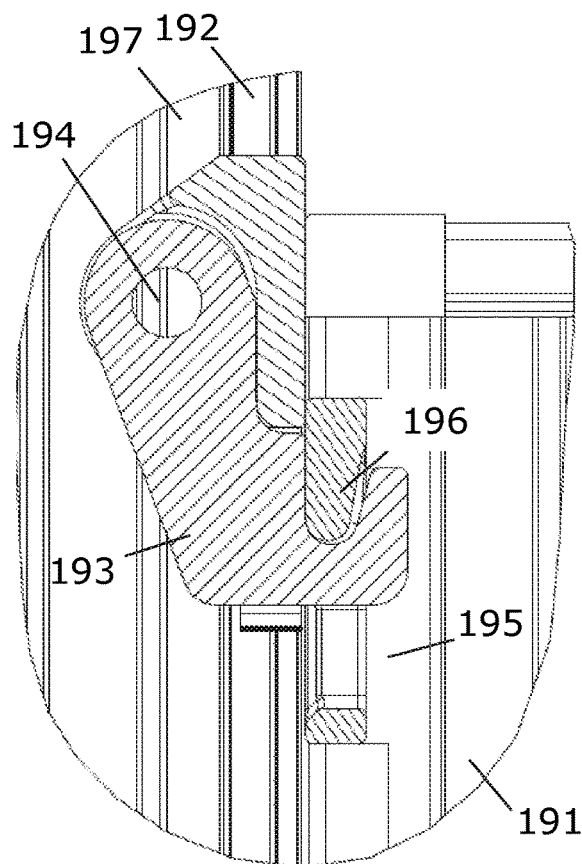

FIG. 19 illustrates further details of a hook for attaching the service unit 191 to the main unit 192. The hook 193 is suspended rotationally at the hinge 194 in the main unit. The hook can rotate through the opening 195 in the service unit and catch a recess or edge 196 in the service unit.

Figure 20:
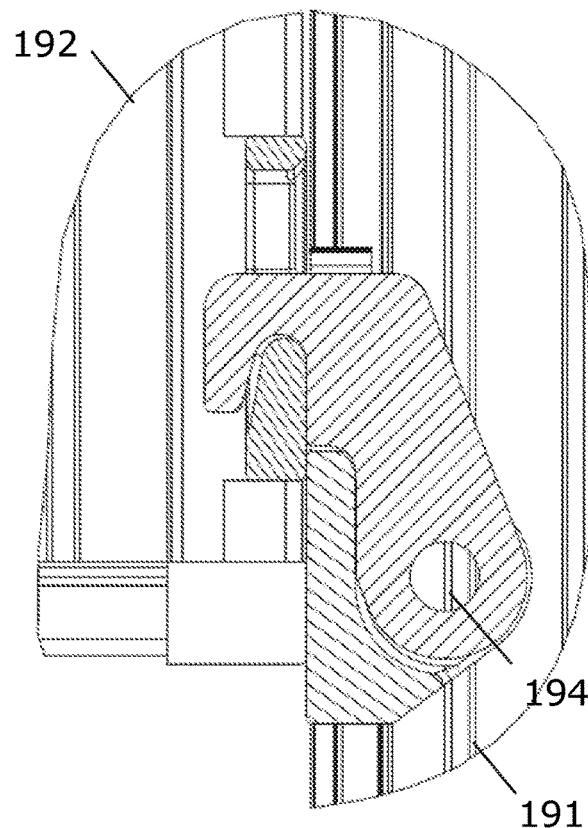

The hook could also be attached in the service unit and catch a recess or edge in the main unit, in which case it may be attached reversely, i.e. as illustrated in FIG. 20. The position of the hook may be controlled by an actuator.

Figure 21:
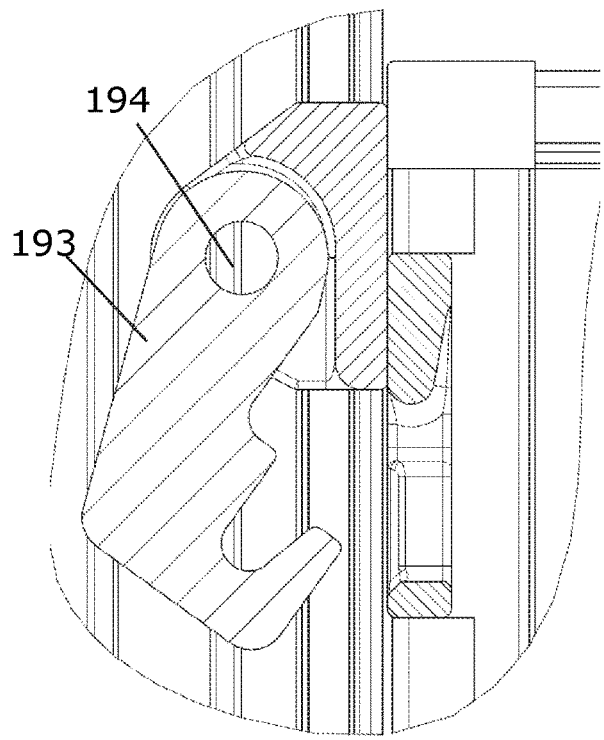
FIG. 21 illustrates the hook in an open position where the service unit is free to be lowered to the ground.

FIG. 21 illustrates the hook in an open position where the service unit is free to be lowered to the ground.

Figure 22:
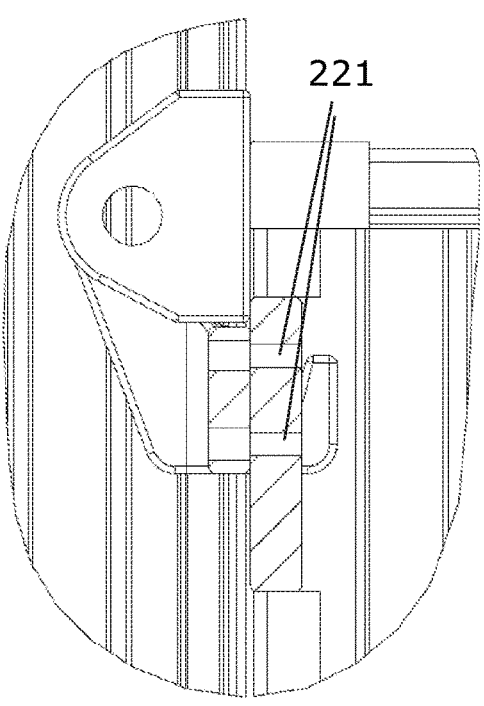
FIG. 22 illustrates a cross section with two bolt holes for attachment of the service unit on the main unit.

FIG. 22 illustrates a cross section where two bolt holes 221 can be seen. The bolt holes facilitate attachment of the service unit on the main unit by use of bolts for solid fixation. In this embodiment, the hook is mainly for positioning the service unit in the correct height relative to the main unit, and the bolts are for joining the units.

In FIGS. 19, 21 and 22, the hook is preferably supported by the main frame of the main unit, e.g. via column or support posts arranged along an inner surface of the main unit. In FIG. 19, the column 197 extends along an inner surface of the main unit and supports the hook on the main frame in the bottom part of the main unit.

In FIG. 20, where the hook forms part of the service unit, the edge in the main unit where the hook engages, may preferably be carried by the main frame in the main unit. Again, this could be via posts or columns arranged along an inner surface of the main unit.

The hook could be moved between the open position (FIG. 21) and the closed position (FIG. 19, 20, 22) by power driven means, e.g. including a hydraulically driven actuator.

Figure 23:
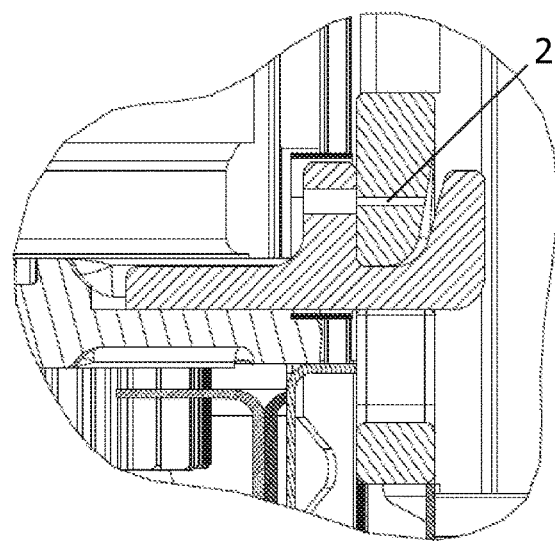
FIGS. 23, 24, 25 illustrate an embodiment where the hook is configured for sliding.
Figure 24:
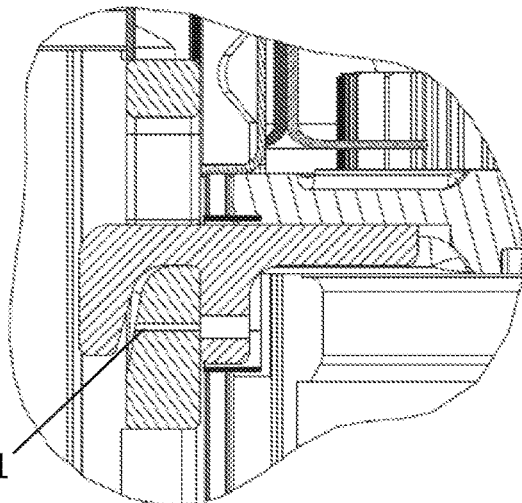

FIGS. 23, 24, 25 illustrate an embodiment where the hook is not rotationally suspended but slidingly suspended. The function is similar to the embodiment of FIGS. 19-22. In FIGS. 23 and 24, a cross sectional view illustrates a bolt hole 231 which can be used for solid, bolted fixation of the service unit on the main unit. The hook in FIG. 23 is attached to the main unit and the hook in FIG. 24 is attached to the service unit.

Figure 25A:
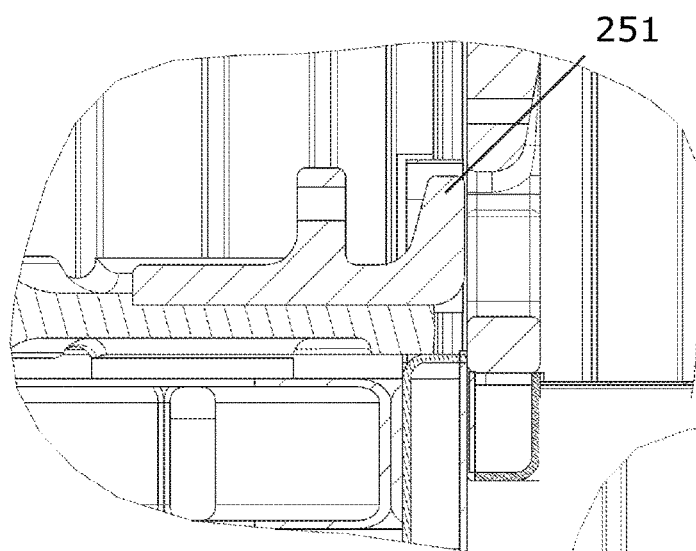
Figure 25B:
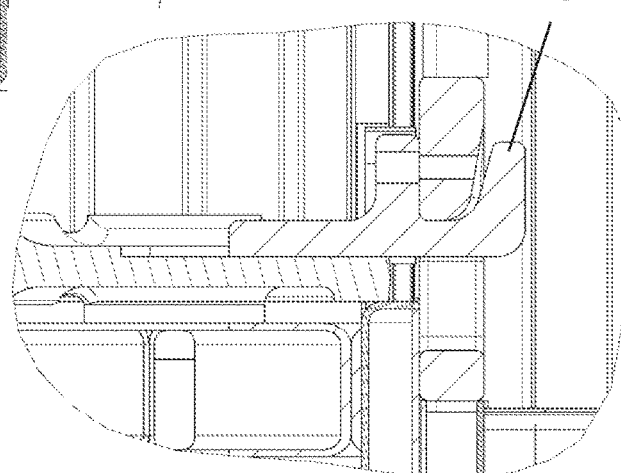

In FIG. 25*a*, the hook 251 is slided to the left thereby disengaging the edge of the service unit and allowing the service unit to be lowered to the ground. In FIG. 25*b*, the hook 251 is slided to the right, thereby engaging the edge of the service unit and holding the two units fixed to each other. The hook may be slided by power driven means, e.g. by a hydraulic actuator.

In the description above, FIGS. 19-25 are explained as parts of the unit fixation structure for fixing the service unit to the main unit. Similar structures may constitute the second interface by which the crane is releasably fixed to the main unit. Similar structures may also constitute the first interface by which the crane is releasably fixed to the service unit, and similar structures may constitute the third fixation structure by which two service units are fixed to each other.

Figure 26:
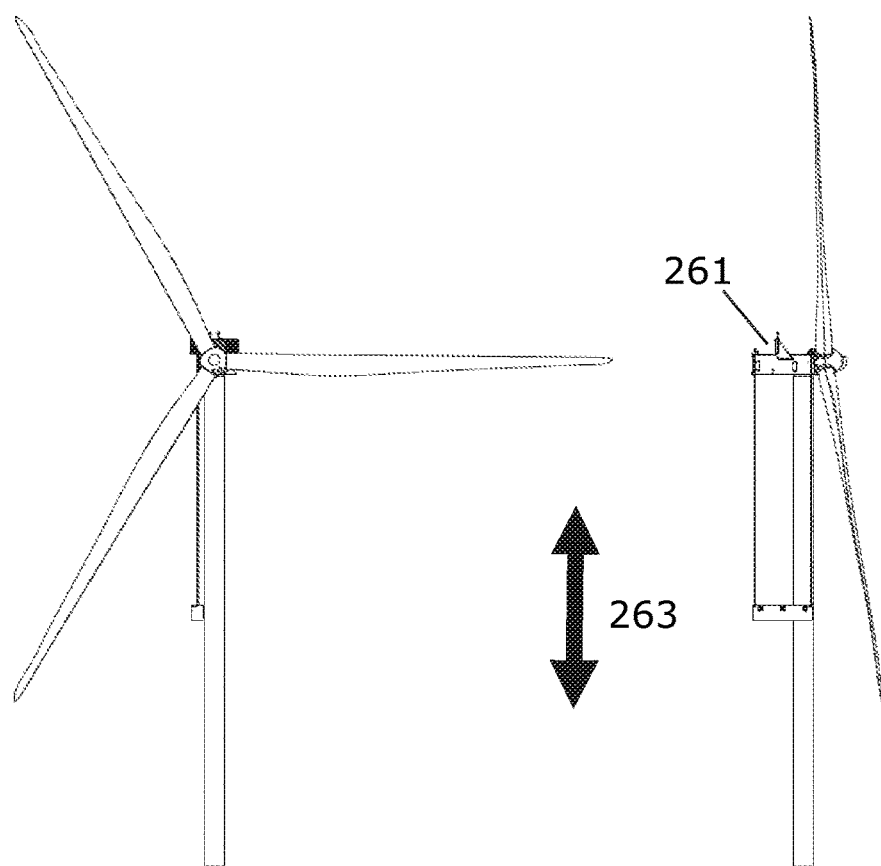
FIGS. 26-28 illustrate embodiments including an additional crane on the main unit for hoisting the service unit.

FIG. 26 illustrates hoisting of a service unit up or down, e.g. if a service unit is to be used for a specific period of time during assembly of the wind turbine or during maintenance etc. The service unit is hoisted by use of an internal crane 261 forming part of the main unit. Movement is essentially only in the vertical plane, illustrated by the arrow 263, and the attachment of the service unit on the main unit may be facilitated by a unit fixation structure as described previously, including movable fixation features such as hinged or slidable hooks etc.

Figure 27:
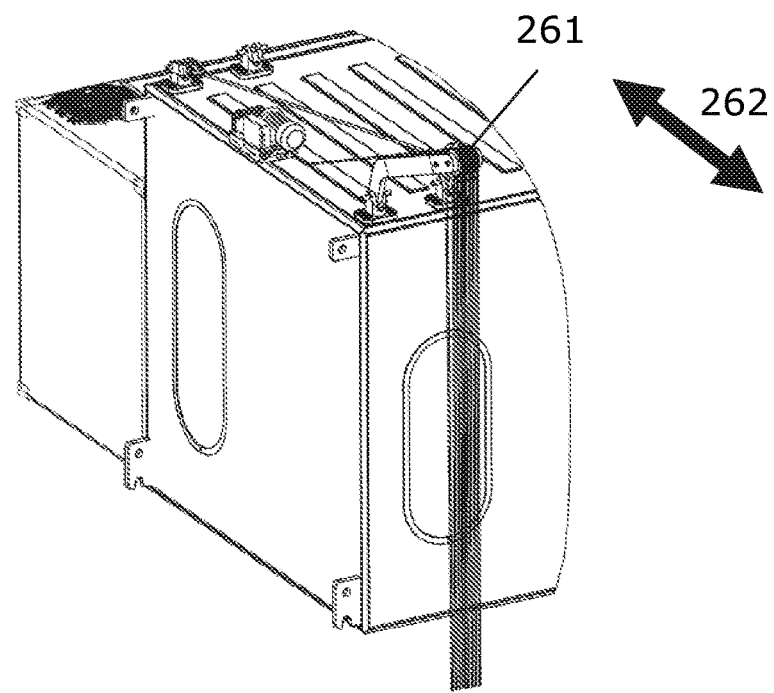

FIG. 27 illustrates the internal crane 261 in an enlarged view. The crane is attached to a roof part of the main unit. The internal crane can hoist the service unit in a vertical direction to a position where said unit fixation structures can form engagement between the main and the service units. This procedure may not require movement in other directions than the vertical direction and therefore facilitates a simple assembly procedure with reduced need for external crane assistance. For adjustment in a horizontal plane, the crane 261 may have the option of moving horizontally, e.g. as illustrated by the arrow 262.

Figure 28:
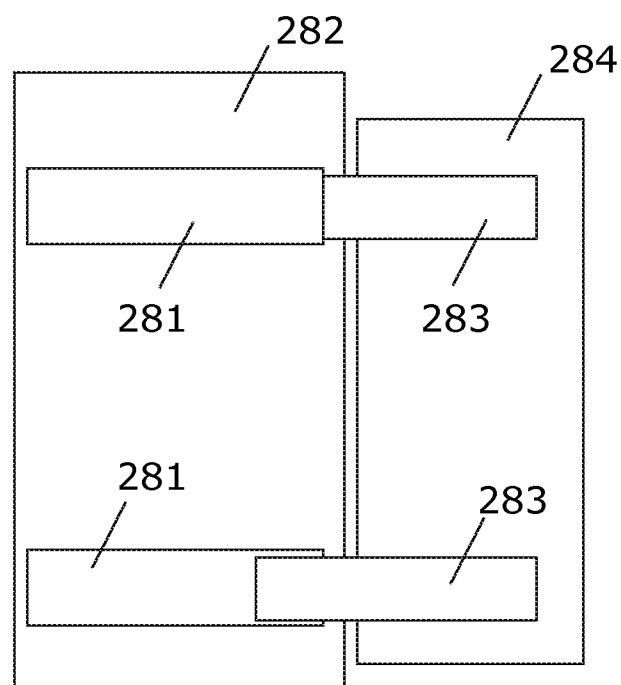

FIG. 28 illustrates schematically, another crane structure for an internal crane. This embodiment includes a double cantilever beam 281 on the roof of the main unit 282. The cantilever beam 281 can extend sideways in telescopic section 283. The cantilever beam facilitates lifting and connection of the service unit 284 to the main unit 282. Even though the unit fixation structures disclosed herein, including pivotable or slidable hooks, generally facilitate attachment of the service unit by hoisting only in the vertical direction, the in and out movement facilitates fine adjustment of a horizontal distance between the main unit and the service unit.

Figure 29:
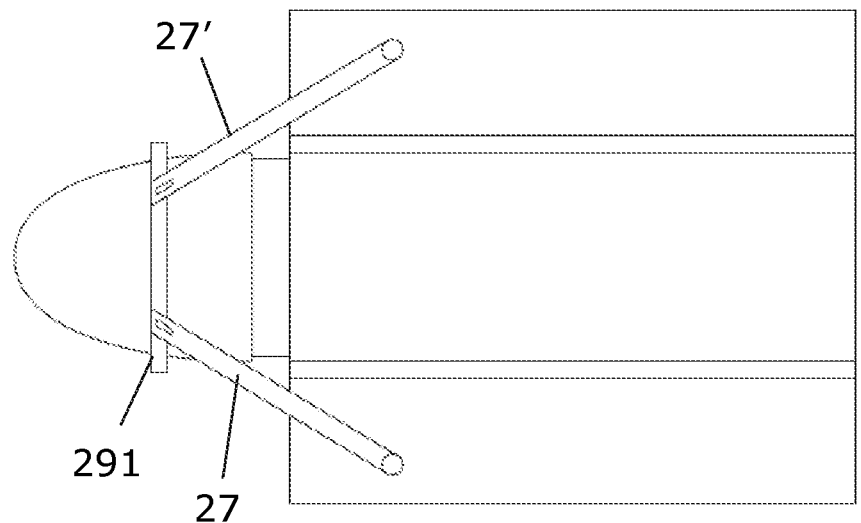
FIGS. 29-34 illustrate different ways of lifting components by the crane.

FIG. 29 illustrates a lifting method where two cranes 27, 27' cooperate in the lifting of the hub 4 via a lifting bracket 291.

Figure 30:
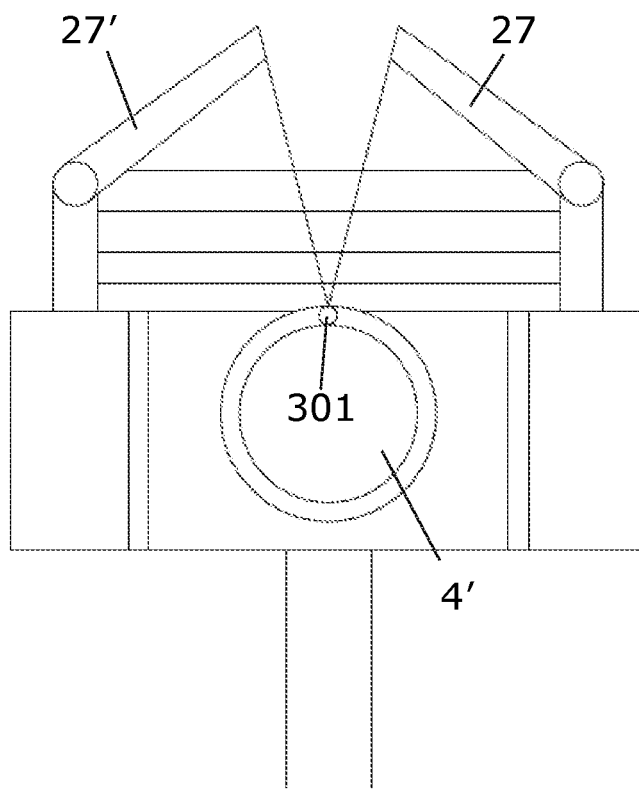

FIG. 30 illustrates a lifting method where two cranes 27, 27' cooperate in the lifting of the hub 4 directly at one common lifting point, e.g. formed by a lifting lug 301 attached to the hub.

Figure 31:
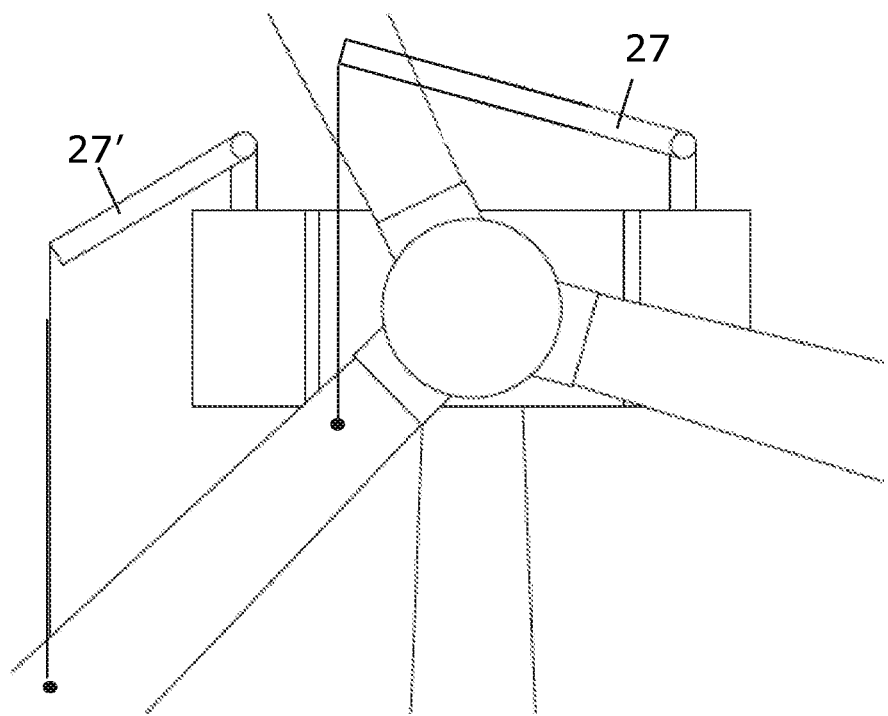

FIG. 31 illustrates a lifting method where two cranes 27, 27' work in collaboration on blade lifting. One crane 27 working on lifting a root end of the blade, and the other crane 27' is lifting a tip end of the blade.

Figure 32:
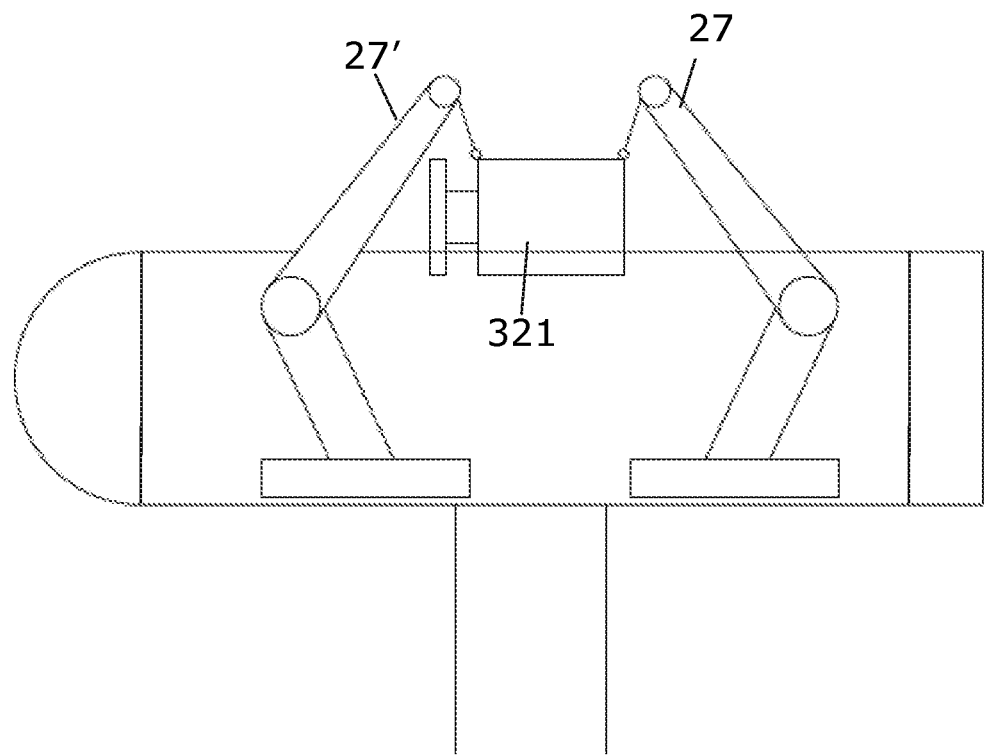

FIG. 32 illustrates a lifting method where two cranes 27, 27' cooperate in the lifting a gearbox, a generator, or similar component 321 of the drivetrain. In this procedure, the component is lifted sideways out of the nacelle and lowered to the ground. The two cranes may be in the same service unit, in this case a service unit on the left side of the main unit.

Figure 33:
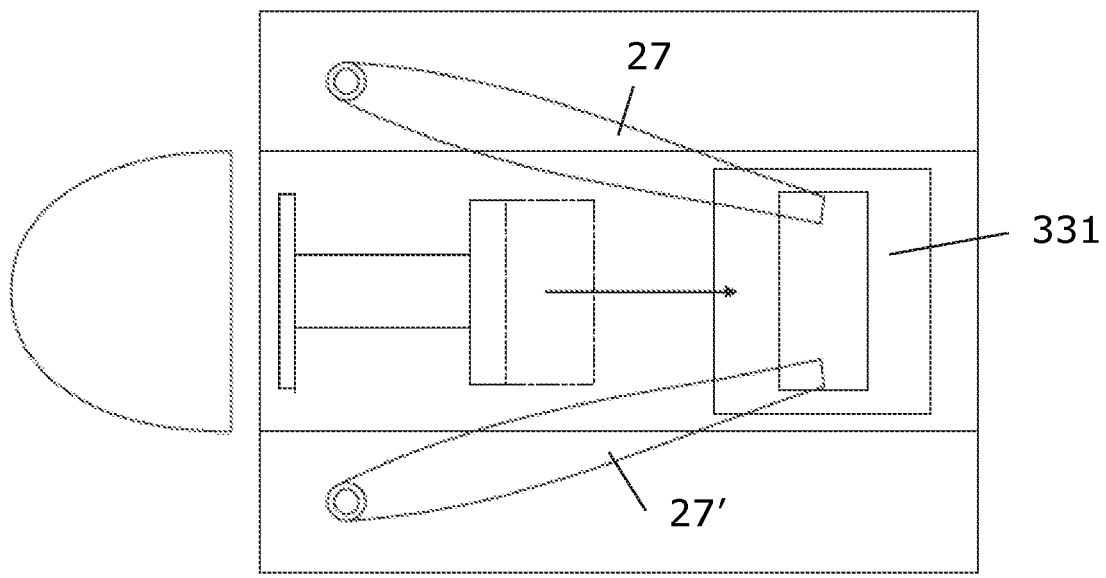

FIG. 33 illustrates a lifting method where two cranes 27, 27' cooperate in the lifting a gearbox, a generator, or similar component 321 of the drivetrain. In this procedure, the component is lifted through an opening 331 in the floor of the nacelle. The two cranes may be located in the same service unit or, as illustrated, in different service units, in this case a service unit on the left side of the main unit and a service unit on the right side of the main unit.

Figure 34:
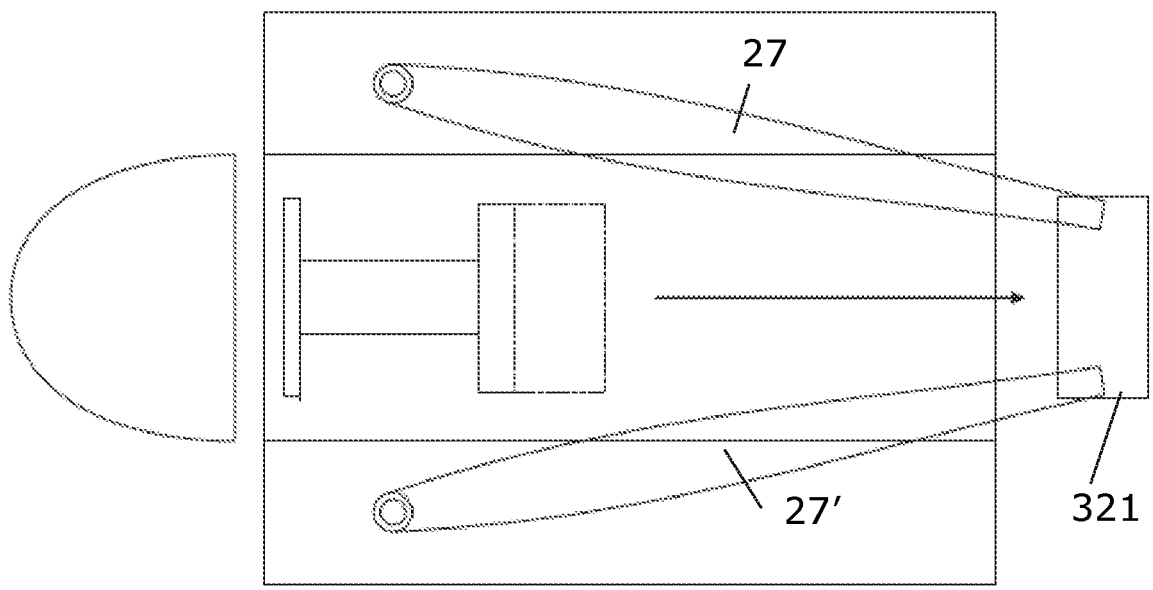

FIG. 34 illustrates a lifting method where two cranes 27, 27' cooperate in the lifting a gearbox, a generator, or similar component 321 of the drivetrain. In this procedure, the component is lifted rearwards out of the nacelle. The two cranes may be located in the same service unit or, as illustrated, in different service units, in this case a service unit on the left side of the main unit and a service unit on the right side of the main unit.

FIGS. 35-36 illustrate an embodiment of a main frame configured for carrying the weight of the crane.

Figure 35A:
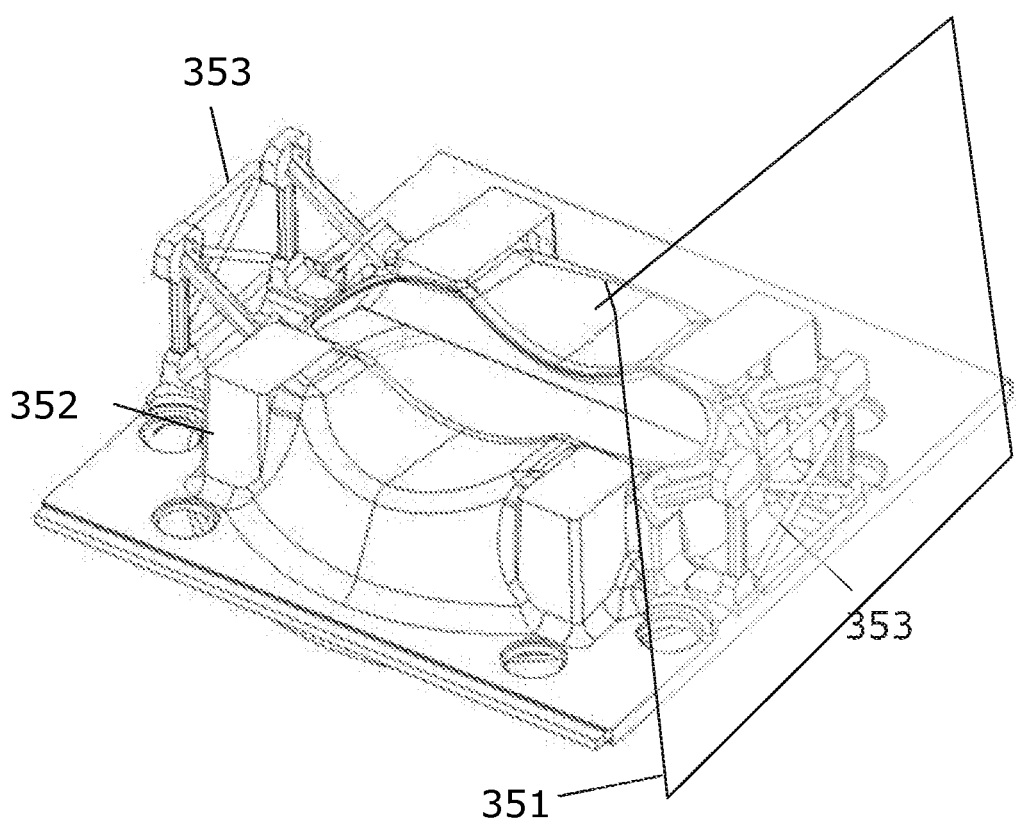
FIGS. 35-37 illustrate different embodiments of main frames configured for carrying the weight of the crane.

In FIG. 35a, a part of the main frame is illustrated in a perspective view seen from one side. The shaded plane 351 illustrates a side panel of the main unit and the bearing support is attached to, or forms part of the main frame 352 which is enclosed in the main unit. The main frame is carried via the yaw arrangement by the tower of the wind turbine. The main frame 352 carries the crane-supporting assembly 353.

Figure 35B:
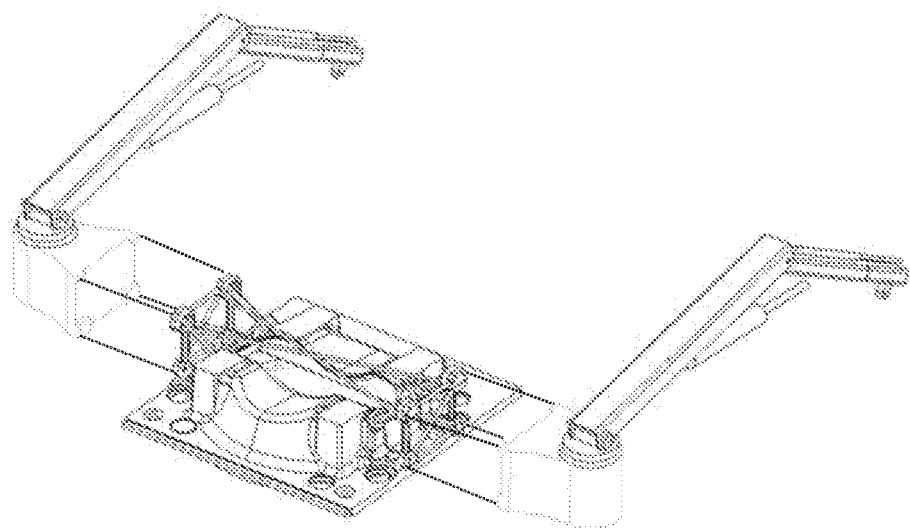

FIG. 35b illustrates that the supporting assembly is configured for carrying the crane which is located along the outer side wall formed by the panel. The crane thereby becomes connected in load bearing manner directly to the main frame. In FIG. 35b, the crane attachments are illustrated by the dotted lines. This could e.g. be a bolt connection through the sidewall of the main unit into the crane-supporting assembly.

FIG. 36 shows the main frame and crane-supporting assembly seen from above and with the main unit 361 drafted schematically to illustrate that the crane-supporting assembly is directly against an inner surface of the main unit to allow the crane to be placed along an outer surface of a side wall portion of the main unit and directly connected to the main frame. In the illustrated embodiment, the main frame comprises two crane-supporting assemblies 353, i.e. one on both sides of a vertical plane through the rotor axis illustrated by the dotted line 362. The main unit comprises two side wall portions 363, 364 extending in the direction of the rotation axis 362 (dotted line) on opposite sides of the rotation axis 362.

FIG. 37 illustrates the main unit from FIG. 36 but with two optional side units 371, 372 in which the crane can be contained and still be suspended directly on the main frame by the crane-supporting assemblies 353.

Figure 38:
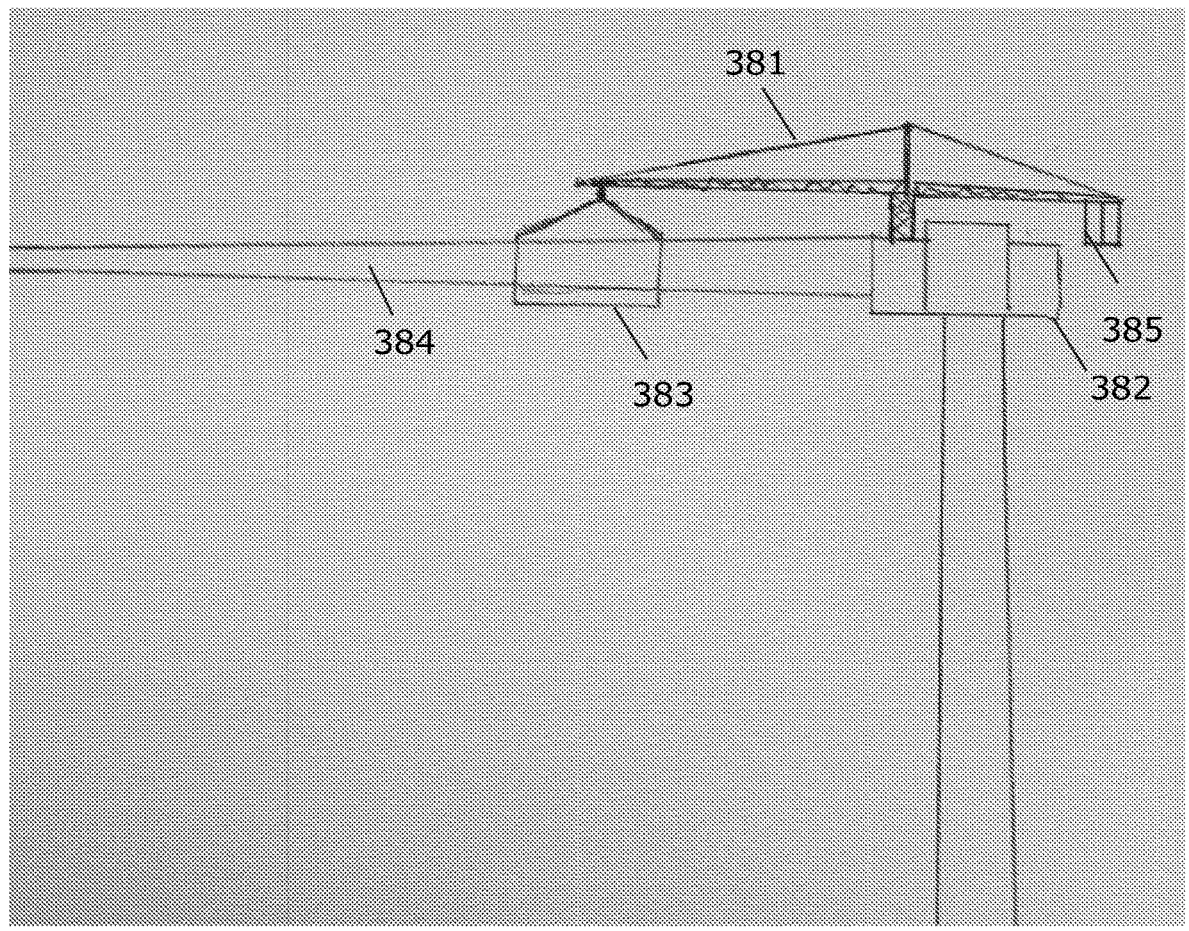
FIG. 38 illustrates the use of a tower crane connected directly to the main frame.

FIG. 38 illustrates a tower crane 381 attached directly to the main frame of the nacelle 382 and located outside the main unit. The tower crane is configured with a lifting tool 383 for lifting the blade 384. The use of a tower crane provides good reachability relative to the long blades and therefore improves the blade mounting and demounting procedure. The tower crane comprises a contra-load 385. The contra-load could be enclosed in a separate unit, e.g. the service unit. The tower crane may or may not be part of a service unit. In one embodiment, the tower crane is provided in the service unit, e.g. together with contra-load or other related parts.

Definitions

Herein, the term "nacelle" means the generally accepted term describing the machine house for a wind turbine, i.e. that part which carries the rotor and drivetrain, and which is carried by the wind turbine tower.

The terms "main unit", "service unit", and "auxiliary unit" herein refers to units which can be transported separately, and which can be assembled with one or more other units to form the nacelle.

Herein, the term "rotor-supporting assembly" refers to those parts of the nacelle which carries the rotor, typically a drivetrain, a main bearing and a main frame. The drivetrain may include different components depending on the type of wind turbine, e.g. a rotor shaft, the generator, and optionally a gearbox between the rotor shaft and the generator.

The invention claimed is:

1. A wind turbine nacelle comprising a main unit housing a main frame supporting a rotor assembly, the rotor assembly defining a rotation axis and the main unit being arranged to be mounted on the wind turbine tower via the main frame, the wind turbine further comprising at least one crane placed outside the main unit and connected to the main frame.

2. The nacelle according to claim 1, wherein the main unit comprises at least two side wall portions extending along the rotation axis on opposite sides of the rotation axis and wherein the at least one crane is placed along one of the at least two side wall portions.

3. The nacelle according to claim 2, further comprising at least one service unit placed along one of the at least two side wall portion, wherein the main unit and the service unit are separate units releasably assembled at a service unit interface, and the service unit accommodates the crane.

4. The nacelle according to claim 3, comprising a first interface configured for releasable connection of the at least one crane to the service unit.

5. The nacelle according to claim 1, comprising a second interface configured for releasable connection of the at least one crane to the main frame.

6. The nacelle according to claim 1, wherein the at least one crane is movable between a collapsed configuration in which it is completely enclosed by the service unit and an expanded configuration in which the at least one crane extends through an opening of the service unit.

7. The nacelle according to claim 1, wherein the at least one crane is configured to operate on parts of rotor carried by the rotor-supporting assembly.

8. The nacelle according to claim 1, wherein the at least one crane comprises a power interface configured to releasably connect to a power supply in the main unit.

9. The nacelle according to claim 1, wherein the service unit comprises accommodation facilities for personnel.

10. The nacelle according to claim 1, further comprising an additional crane connected to the main frame.

11. The nacelle according to claim 10, wherein the main unit comprises at least two side wall portions extending along the rotation axis on opposite sides of the rotation axis, wherein the at least one crane is placed along one of the at least two side wall portions, and wherein the additional crane is placed along the other of the at least two side wall portions of the main unit.

12. The nacelle according to claim 10, further comprising a control unit configured to operate the at least one crane and the additional crane in a coordinated procedure where reeling of a crane line of the at least one crane and reeling of an additional crane line of the additional crane are conducted simultaneously.

13. The nacelle according to claim 12, wherein the crane line is reeled by a power driven winch and the additional crane line are reeled by an additional power driven winch, the power driven winch and the additional power driven winch being powered by the same power source.

14. The nacelle according to claim 1, further comprising an internal crane forming part of the main unit.

15. The nacelle according to claim 14, wherein the internal crane is arranged to hoist the at least one crane or service unit to and from the main unit.

16. A wind turbine with a nacelle according to claim 1.

17. A method of making a wind turbine, the method comprising:
    receiving a main unit having a main frame configured to form part of a rotor-supporting assembly and arranged to be connected to a wind turbine tower via the main frame;
    receiving at least one crane;
    attaching the main unit to the tower via the main frame;
    arranged the at least one crane outside the main unit and connecting the at least one crane directly to the main frame; and
    operating the at least one crane for hoisting wind turbine components.

18. The method according to claim 17, wherein the main unit comprises at least two side wall portions extending along the rotation axis on opposite sides of the rotation axis and wherein the at least one crane is placed along one of the at least two side wall portions.

19. The method according to claim 17, wherein the at least one crane is received in at least one service unit arranged to be connected releasably to the main unit, and wherein the at least one crane is arranged along the first outer side wall portion by attaching the service unit to the main unit, and attaching the at least one crane directly to the main frame.

20. The method according to claim 19, wherein the at least one crane is used for lifting at least a part of the rotor.

21. The method according to claim 19, wherein the service unit or the at least one crane is attached to the main unit before the main unit is attached to the wind turbine tower.

22. The method according to claim 17, wherein the service unit or the at least one crane is attached to the main unit after the main unit is attached to the wind turbine tower.

23. The method according to claim 17, wherein the service unit or the at least one crane is detached from the main unit when the at least one crane has been used for lifting the components.

24. The method according to claim 23, wherein an auxiliary unit is attached to the main unit to replace the service unit or the at least one crane, the auxiliary unit housing an operative component of the wind turbine.

* * * * *